(12) United States Patent
Lablans

(10) Patent No.: US 12,143,468 B2
(45) Date of Patent: *Nov. 12, 2024

(54) CRYPTOGRAPHIC COMPUTER MACHINES WITH NOVEL SWITCHING DEVICES

(71) Applicant: Peter Lablans, Morris Township, NJ (US)

(72) Inventor: Peter Lablans, Morris Township, NJ (US)

(73) Assignee: LCIP JV, Morristown, NJ (US)

( * ) Notice: Subject to any disclaimer, the term of this patent is extended or adjusted under 35 U.S.C. 154(b) by 486 days.

This patent is subject to a terminal disclaimer.

(21) Appl. No.: 17/402,968

(22) Filed: Aug. 16, 2021

(65) Prior Publication Data

US 2023/0125560 A1 Apr. 27, 2023

Related U.S. Application Data

(63) Continuation-in-part of application No. 17/240,635, filed on Apr. 26, 2021, and a continuation-in-part of
(Continued)

(51) Int. Cl.
*H04L 9/06* (2006.01)
*H03M 7/00* (2006.01)
(Continued)

(52) U.S. Cl.
CPC ............ *H04L 9/0618* (2013.01); *H03M 7/00* (2013.01); *H03M 13/158* (2013.01); *H04L 9/06* (2013.01);
(Continued)

(58) Field of Classification Search
CPC ....... H04L 9/0816; H04L 9/0861; H04L 9/06; H04L 9/0618; H04L 9/3066; H04L 9/3093; H04L 9/3218
See application file for complete search history.

(56) References Cited

U.S. PATENT DOCUMENTS

| 3,958,081 A | * | 5/1976 | Ehrsam | ................. | H04L 9/0625 380/37 |
| 3,962,539 A | * | 6/1976 | Ehrsam | ................. | H04L 9/0625 380/37 |

(Continued)

OTHER PUBLICATIONS

Craig Costello, Supersingular isogeny key exchange for beginners, Microsoft Research, USA, 2019, downloaded from ia.cr/2019/1321.
(Continued)

*Primary Examiner* — Jason Chiang

(57) ABSTRACT

Operational n-state digital circuits and n-state switching operations with n and integer greater than 2 execute Finite Lab-transformed (FLT) n-state switching functions to process n-state signals provided on at least 2 inputs to generate an n-state signal on an output. The FLT is an enhancement of a computer architecture. Cryptographic apparatus and methods apply circuits that are characterized by FLT-ed addition and/or multiplication over finite field GF(n) or by addition and/or multiplication modulo-n that are modified in accordance with reversible n-state inverters, and are no longer known operations. Cryptographic methods processed on FLT modified machine instructions include encryption/decryption, public key generation, and digital signature methods including Post-Quantum methods. They include modification of isogeny based, NTRU based and McEliece based cryptographic machines.

20 Claims, 7 Drawing Sheets

Related U.S. Application Data application No. 16/717,691, filed on Dec. 17, 2019, now Pat. No. 11,336,425, said application No. 17/240,635 is a continuation-in-part of application No. 16/532,489, filed on Aug. 6, 2019, now abandoned, and a continuation-in-part of application No. 16/172,584, filed on Oct. 26, 2018, now Pat. No. 11,093,213, said application No. 16/532,489 is a continuation-in-part of application No. 15/499,849, filed on Apr. 27, 2017, now Pat. No. 10,375,252, said application No. 16/172,584 is a continuation-in-part of application No. 15/442,556, filed on Feb. 24, 2017, now Pat. No. 10,515,567, and a continuation-in-part of application No. 14/975,841, filed on Dec. 20, 2015, now abandoned.

(60) Provisional application No. 63/162,995, filed on Mar. 18, 2021, provisional application No. 63/118,374, filed on Nov. 25, 2020, provisional application No. 63/067,281, filed on Aug. 18, 2020, provisional application No. 62/902,350, filed on Sep. 18, 2019, provisional application No. 62/610,921, filed on Dec. 27, 2017, provisional application No. 62/455,555, filed on Feb. 6, 2017, provisional application No. 62/435,814, filed on Dec. 18, 2016, provisional application No. 62/299,935, filed on Feb. 25, 2016.

(51) Int. Cl.
*H03M 13/15* (2006.01)
*H04L 9/08* (2006.01)
*H04L 9/30* (2006.01)
*H04L 9/32* (2006.01)

(52) U.S. Cl.
CPC .......... *H04L 9/0816* (2013.01); *H04L 9/0861* (2013.01); *H04L 9/3066* (2013.01); *H04L 9/3093* (2013.01); *H04L 9/3218* (2013.01)

(56) References Cited

U.S. PATENT DOCUMENTS

| | | | | |
|---|---|---|---|---|
| 4,165,444 A * | 8/1979 | Gordon | ................ | H04L 9/0662 380/265 |
| 4,405,829 A | 9/1983 | Rivest et al. | | |
| 4,597,083 A | 6/1986 | Stenerson | | |
| 4,995,082 A | 2/1991 | Schnorr | | |
| 5,054,066 A * | 10/1991 | Riek | ................ | H04L 9/304 713/170 |
| 5,995,539 A * | 11/1999 | Miller | ................ | H04L 25/03343 375/222 |
| 6,052,704 A * | 4/2000 | Wei | ................ | G06F 7/724 708/492 |
| 6,111,952 A * | 8/2000 | Patarin | ................ | H04L 9/3247 380/259 |
| 6,990,624 B2 | 1/2006 | Dohmen | | |
| 7,343,472 B2 | 3/2008 | Porten et al. | | |
| 7,831,895 B2 | 11/2010 | Lin | | |
| 8,332,727 B2 * | 12/2012 | Kim | ................ | G06F 11/1068 714/763 |
| 8,458,575 B2 | 6/2013 | Dohmen | | |
| 8,666,062 B2 * | 3/2014 | Lambert | ................ | G06F 7/726 713/169 |
| 9,485,087 B2 | 11/2016 | Van Assche et al. | | |
| 9,652,200 B2 | 5/2017 | Bos et al. | | |
| 10,515,567 B2 * | 12/2019 | Lablans | ................ | G06F 5/012 |
| 11,093,213 B1 * | 8/2021 | Lablans | ................ | G06F 5/012 |
| 11,336,425 B1 * | 5/2022 | Lablans | ................ | H04J 13/0029 |
| 2002/0038420 A1 * | 3/2002 | Collins | ................ | H04L 9/3249 713/156 |
| 2003/0106014 A1 | 6/2003 | Dohmen et al. | | |
| 2004/0078555 A1 | 4/2004 | Porten et al. | | |
| 2004/0202317 A1 | 10/2004 | Demjanenko | | |
| 2005/0058285 A1 | 3/2005 | Stein | | |
| 2005/0094806 A1 * | 5/2005 | Jao | ................ | G06F 7/725 380/30 |
| 2005/0267926 A1 * | 12/2005 | Al-Khoraidly | ................ | G06F 7/724 708/492 |
| 2006/0149962 A1 * | 7/2006 | Fountain | ................ | H04L 9/0897 713/151 |
| 2007/0011453 A1 * | 1/2007 | Tarkkala | ................ | H04L 9/3247 713/168 |
| 2007/0150794 A1 | 6/2007 | Naslunds et al. | | |
| 2007/0152710 A1 * | 7/2007 | Lablans | ................ | H03K 19/20 326/59 |
| 2008/0013716 A1 * | 1/2008 | Ding | ................ | H04L 9/3093 380/30 |
| 2008/0069345 A1 * | 3/2008 | Rubin | ................ | H04L 9/0841 380/44 |
| 2008/0130873 A1 | 6/2008 | Bolotov et al. | | |
| 2008/0143561 A1 * | 6/2008 | Miyato | ................ | H04L 9/0618 341/79 |
| 2008/0180987 A1 * | 7/2008 | Lablans | ................ | G06F 7/49 365/189.08 |
| 2008/0244274 A1 * | 10/2008 | Lablans | ................ | H04L 9/0662 708/492 |
| 2008/0273695 A1 * | 11/2008 | Al-Gahtani | ................ | G06F 16/13 380/30 |
| 2009/0092250 A1 * | 4/2009 | Lablans | ................ | G06F 7/582 380/255 |
| 2009/0220083 A1 * | 9/2009 | Schneider | ................ | H04L 9/0662 380/42 |
| 2009/0310775 A1 * | 12/2009 | Gueron | ................ | H04L 9/0643 380/28 |
| 2010/0057823 A1 | 3/2010 | Filseth et al. | | |
| 2010/0086132 A1 * | 4/2010 | Tavernier | ................ | H04L 9/304 380/255 |
| 2010/0115017 A1 * | 5/2010 | Yen | ................ | G06F 7/724 708/492 |
| 2010/0208885 A1 * | 8/2010 | Murphy | ................ | H04L 9/003 380/28 |
| 2010/0306299 A1 | 12/2010 | Reidenbach | | |
| 2010/0306525 A1 * | 12/2010 | Ferguson | ................ | H04L 63/06 713/151 |
| 2011/0016321 A1 * | 1/2011 | Sundaram | ................ | H04L 67/34 713/171 |
| 2011/0033046 A1 * | 2/2011 | Nonaka | ................ | H04L 9/3093 380/46 |
| 2011/0211691 A1 * | 9/2011 | Minematsu | ................ | H04L 9/0618 380/46 |
| 2011/0213982 A1 * | 9/2011 | Brown | ................ | H04L 9/3252 713/176 |
| 2011/0243320 A1 * | 10/2011 | Halevi | ................ | H04L 9/0861 380/30 |
| 2012/0023336 A1 * | 1/2012 | Natarajan | ................ | H04L 9/0841 713/179 |
| 2012/0027198 A1 * | 2/2012 | He | ................ | H04L 9/06 380/28 |
| 2012/0027210 A1 * | 2/2012 | Takeuchi | ................ | H04L 9/3263 380/255 |
| 2012/0121084 A1 * | 5/2012 | Tomlinson | ................ | H04L 9/30 380/30 |
| 2017/0169735 A1 * | 6/2017 | Lablans | ................ | H04L 9/0841 |
| 2017/0230509 A1 * | 8/2017 | Lablans | ................ | H04J 13/0033 |
| 2021/0405518 A1 * | 12/2021 | Lablans | ................ | H04N 23/69 |

OTHER PUBLICATIONS

Jao et al. Supersingular Isogeny Key Encapsulation. Oct. 1, 2020, downloaded from https://sike.org/files/SIDH-spec.pdf.
Leonardi A note on the Ending Elliptic Curve in SIDH, 2020 downloaded from https://eprint.iacr.org/2020/262.pdf.
Costello et al. Efficient Compression of SIDH Public Keys, 2017, downloaded from 10.1007/978-3-319-56620-7_24.pdf.

(56) References Cited

OTHER PUBLICATIONS

Fiat-Shamir heuristic, downloaded from https://en.wikipedia.org/wiki/Fiat%E2%80%93Shamir_heuristic.

Feige-Fiat-Shamir identification scheme, downloaded from https://en.wikipedia.org/wiki/Feige%E2%80%93Fiat%E2%80%93Shamir_identification_scheme.

Castryck et al. CSIDH: An Efficient Post-Quantum Commutative Group Action, downloaded from https://csidh.isogeny.org/csidh-20181118.pdf.

Boneh et al. Short signatures from the Weil pairing, downloaded from https://www.iacr.org/archive/asiacrypt2001/22480516.pdf.

Linear-feedback shift register downloaded from https://en.wikipedia.org/wiki/Linear-feedback_shift_register.

Chen et al. NTRU Algorithm Specifications And Supporting Documentation, 2019, downloaded from https://csrc.nist.gov/CSRC/media/Projects/Post-Quantum-Cryptography/documents/round-2/submissions/NTRU-Round2.zip.

Buchanan, A Practical Example for McEliece Cryptography, downloaded from https://medium.com/asecuritysite-when-bob-met-alice/a-practical-example-for-mceliece-cryptography-779bec96ef9d.

Post-quantum cryptography, downloaded from https://en.wikipedia.org/wiki/Post-quantum_cryptography.

Bernstein et al. Classic McEliece:conservative code-based cryptography, 2019 downloaded from https://csrc.nist.gov/CSRC/media/Projects/Post-Quantum-Cryptography/documents/round-2/submissions/Classic-McEliece-Round2.zip.

Schnorr signature , downloaded from https://en.wikipedia.org/wiki/Schnorr_signature.

FIPS PUB 180-2 Secure Hash Standard, 2002, downloaded from https://csrc.nist.gov/csrc/media/publications/fips/180/2/archive/2002-08-01/documents/fips180-2.pdf.

FIPS PUB 186-4 Digital Signature Standard (DSS), 2013, downloaded from https://nvlpubs.nist.gov/nistpubs/FIPS/NIST.FIPS.186-4.pdf.

Hoffstein et al. An Introduction to Mathematical Cryptography, second editionm 2014, Springer, section 7.1 pp. 373-376.

\* cited by examiner

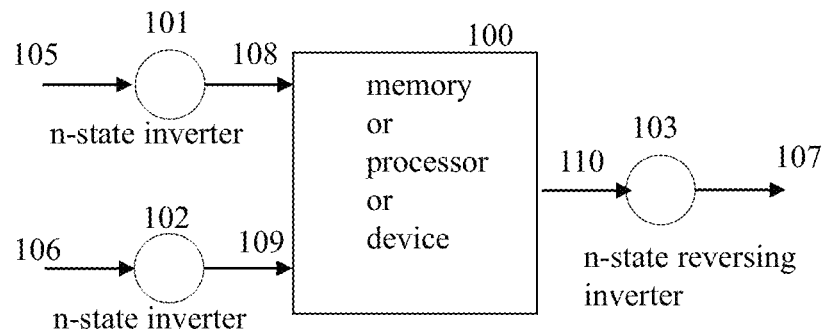

FIG. 1

```
function y=makerinvn(inv);
% Copyright 2017 Ternarylogic LLC. All rights reserved
% make reverse inverter for inv in origin 1
% inv(rinv(i))=i
%inv=inv+1; % operate in origin 1
lent=size(inv); % determine size of inv
len=lent(2);    % number of elements
rinv=inv;       % initialize the reversing inverter for i=1:len
    ind=inv(i); % the index of rinv is the state of inv
    rinv(ind)=i; % the state of rinv is the index of inv
end
y=rinv;  % result in origin 1
```

FIG. 2

```
1   function y=labtransform(table,invert)
2   % lab-transform or Finite Lab-transfor or FLT inverts
3   % n-state switching table 'table' with n-state inverter
4   % 'invert' at inputs & reversing inverter 'rinvert' at
5   % output; the table and inverter are in origin 1
6   % Copyright 2017 Ternarylogic LLC. All right reserved
7
8   % determine size of 'table'
9   lent=size(table);
10  len=lent(2); % len is n
11
12  % initialize 'tableinv' and 'rinvert'
13  rinvert=ones(1,len);
14  tableinv=zeros(len,len);
15
16  % determine 'rinvert' from 'invert'
17  for i=1:len
18      ind=invert(i);
19      rinvert(ind)=i;
20  end
21
22  % determine modified table 'tableinv'
23  for i1=1:len
24      for i2=1:len
25          k1=invert(i1); % invert input 1
26          k2=invert(i2); % invert input 2
27          aa=table(k1,k2);
28          tableinv(i1,i2)=rinvert(aa); % invert output
29      end
30  end
31  y=tableinv; % the Lab-transformed switching table
```

FIG. 3

```
1     function y=invmatn(mat,scn,mgn,minn,s,e,n)
2     % determine inverse of mat under FLT
3     % © Copyright 2021 Ternarylogic LLC. All right reserved
4  -  lent=size(mat); len=lent(1);
5  -  dmat=findetn(mat,scn,mgn,minn,s,e,n); % determinant
6  -  invx=mgn(dmat,:);
7  -  ind=find(invx==e); % multiply term
8  -  mt=mat;
9  -  for i1=1:len
10 -      for i2=1:len
11 -          mt=mat;
12 -          mt(i1,:)=[];
13 -          mt(:,i2)=[];
14 -          dd=findetn(mt,scn,mgn,minn,s,e,n); % minor determinant
15 -          fac=(-1)^(i1+i2);
16 -              if fac==-1
17 -                  hh=minn(s,dd);
18 -              else
19 -                  hh=dd;
20 -              end
21 -                  y(i1,i2)=hh;
22 -      end
23 -  end
24 -  end
25 -  gg=y;
26    % transpose gg to mm
27 -  gg=gg';
28    %multiply with ind=dmat^-1
29 -     for i1=1:len
30 -        for i2=1:len
31 -            y(i1,i2)=mgn(ind,gg(i1,i2));
32 -        end
33 -     end
```

FIG. 8

```
1   function y = findetn(mat,scn,mn,minn,z,e,n)
2   % determine FLT based determinant
3   % © Copyright 2021 Ternarylogic LLC. All right reserved
4   lent=size(mat);
5   m=lent(2);
6      if m==2
7          aa1=mn(mat(1,1),mat(2,2));
8          aa2=mn(mat(1,2),mat(2,1));
9          y=minn(aa1,aa2);
10     else
11         y=z;
12         i = 1;
13      for j = 1:m
14          minor = mat;
15          minor(i,:) = [];
16          minor(:,j) = [];
17          cc=((-1)^(i+j));
18          newc=findetn(minor,scn,mn,minn,z,e,n);
19          vain=mn(mat(i,j),newc);
20          if cc==-1
21              y=minn(y,vain);
22          else
23              y=scn(y,vain);
24          end
25      end
26     end
27  end
```

FIG. 9

CRYPTOGRAPHIC COMPUTER MACHINES WITH NOVEL SWITCHING DEVICES

COPYRIGHT NOTICE

A portion of the instant disclosure contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application claims the benefit and is a continuation-in-part of U.S. patent application Ser. No. 16/172,584 filed on Oct. 26, 2018. This application claims the benefit and is a continuation-in-part of U.S. patent application Ser. No. 16/717,691 filed on Dec. 17, 2019. This application claims the benefit and is a continuation-in-part of U.S. patent application Ser. No. 17/240,635 filed on Apr. 26, 2021. Application Ser. No. 17/240,635 claims the benefit and is a continuation-in-part of U.S. patent application Ser. No. 16/532,489 filed on Aug. 6, 2019 now abandoned. U.S. patent application Ser. No. 16/532,489 claims the benefit and is a continuation-in-part of U.S. patent application Ser. No. 15/499,849 filed on Apr. 27, 2017 now U.S. Pat. No. 10,375,252. Application Ser. No. 16/172,584 claims the benefit and is a continuation-in-part of U.S. patent application Ser. No. 14/975,841 filed on Dec. 20, 2015, now abandoned. U.S. patent application Ser. No. 16/172,584 claims the benefit of and is a continuation-in-part of patent application Ser. No. 15/442,556 filed on Feb. 24, 2017, U.S. patent application Ser. No. 16/172,584 claims the benefit of U.S. Provisional Patent Application No. 62/610,921 filed on Dec. 27, 2017, which is incorporated herein by reference. U.S. patent application Ser. No. 15/442,556 claims the benefit of U.S. Provisional Patent Application No. 62/299,935 filed on Feb. 25, 2016, and of U.S. Provisional Patent Application No. 62/435,814 filed on Dec. 18, 2016, and of U.S. Provisional Patent Application No. 62/455,555 filed on Feb. 6, 2017. This application claims the benefit of U.S. Provisional Patent Application No. 63/067,281 filed on Aug. 18, 2020 and of U.S. Provisional Patent Application No. 63/118,374 filed on Nov. 25, 2020 and of U.S. Provisional Patent Application No. 63/162,995 filed on Mar. 18, 2021. U.S. patent application Ser. No. 16/717,691 claims the benefit of U.S. Provisional Patent Application No. 62/902,350 filed on Sep. 18, 2019. All the above Provisional and Non-provisional U.S. Patent Applications and Patents are incorporated herein by reference in their entirety.

BACKGROUND OF THE INVENTION

The present invention relates to apparatus and methods for computer cryptography that provide increased security of data exchange by modifying aspects of proven cryptography methods. The looming appearance of Quantum Computers require better resistance of computer data exchange against cryptanalysis and other attacks. Novel and improved cryptographic computers and methods are required.

SUMMARY OF THE INVENTION

In accordance with an aspect of the present invention, cryptographic apparatus and methods are provided that perform modified known cryptographic methods, including encryption/decryption, public-key cryptography, message digest cryptography and elliptic curve cryptography, wherein at least one known n-state switching operation is replaced by a modified n-state switching operation, wherein a modification is achieved by modifying the n-state operation in accordance with a Finite Lab-Transform (FLT). The FLT includes transforming input n-state data which represent input signals with a first n-state reversible inverter and transforming data outputted by the n-state switching operation by a second n-state reversible inverter. In one embodiment a combination of the first and second n-state inverter establish an n-state identity inverter. Herein n is a positive integer with n>2 or n>5 or n>64 or n>256 or n is very large with n being a positive integer having more than 50 digits.

The n-state switching operation is one of several n-state switching operations in a computer device as commonly used in cryptography and are usually characterized by one of the following operations: a modulo-n addition, a known addition over a finite field GF(n), a modulo-n multiplication and a known multiplication over a finite field GF(n). A known operation over a finite field GF(n) is either a modulo-n addition or modulo-n multiplication when n is a prime number, or it is defined by a primitive polynomial when $n=q^p$ with q being prime >1 and p is 2 or greater. In accordance with an aspect of the present invention, application of the FLT creates a modified n-state switching operation that is no longer known as defined above. Certain FLTs do create known additions and/or multiplications over $GF(n=q^p)$. In accordance with an aspect of the present invention such FLTs are discarded and are not applied. That is: if an FLT of an n-state operation creates a modified n-state switching operation that is a known n-state switching operation then that modified n-state operation is not applied as a replacement in a cryptographic operation.

In accordance with an aspect of the present invention an FLT based modification is applied to public data in data exchange between computing machines. The modification may be generating an FLTed multiplicative inverse.

DESCRIPTION OF THE DRAWINGS

FIG. 1 illustrates in diagram a device that performs in accordance with a Finite Lab Transform;

FIGS. 2 and 3 are screenshots of computer programs that execute instructions in accordance with aspects of the present invention;

FIG. 8 is a screenshot of a computer stored program that computes an FLT modified inverse matrix in accordance with an aspect of the present invention;

FIG. 9 is a screenshot of a computer stored program that computes an FLT modified determinant of a matrix in accordance with an aspect of the present invention;

DESCRIPTION OF A PREFERRED EMBODIMENT

Figure 4:
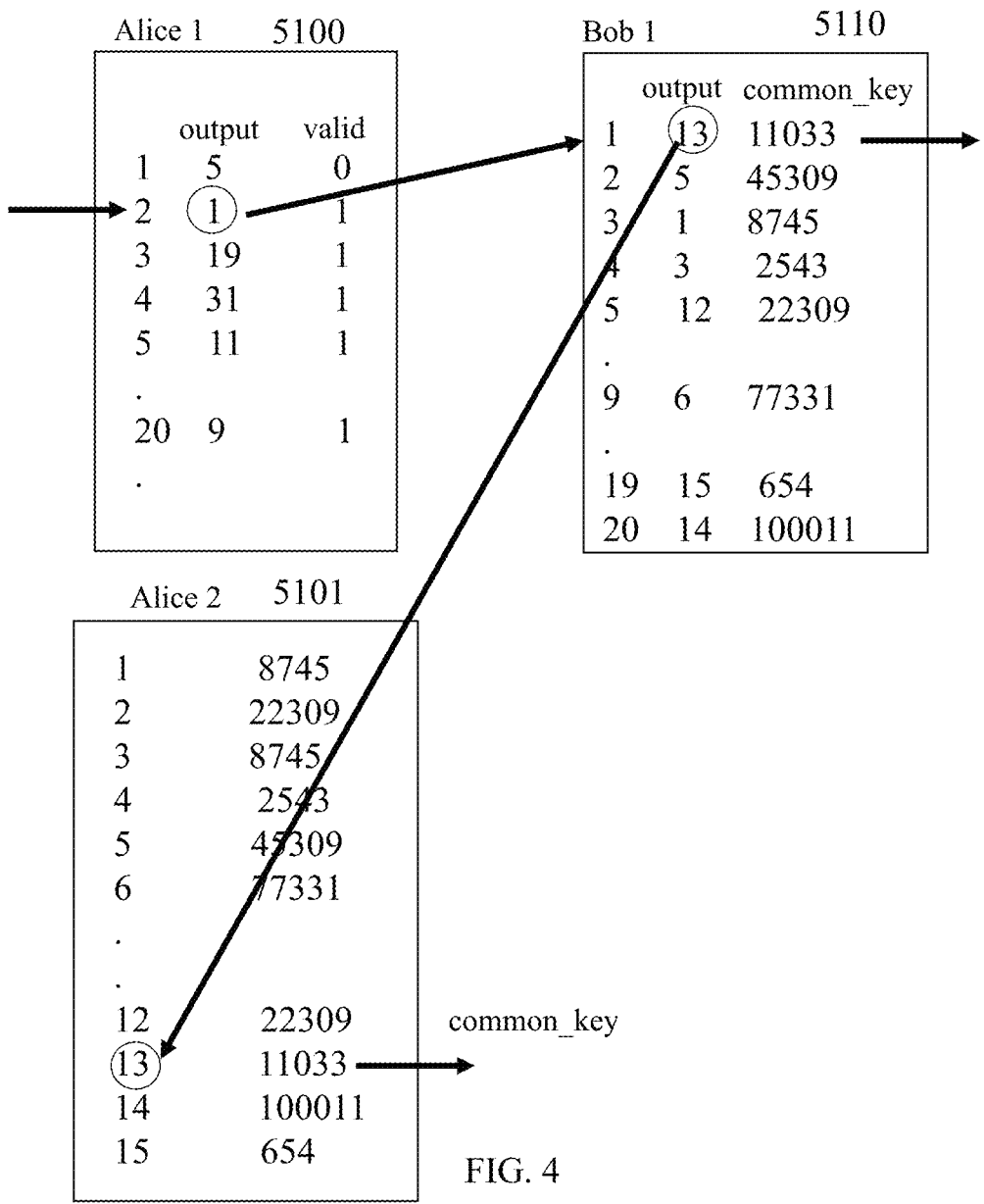
FIG. 4 illustrates a cryptographic device in accordance with an aspect of the present invention.

An n-state inverter is a machine circuit or a machine operation based on physical instructions wherein an input signal having one of n states with n an integer greater than 2 generates an output signal having one of n states. A reversible n-state inverter uniquely modifies each of n states into one of n states. Identity is a reversible n-state inverter. A reversing n-state inverter of a reversible n-state inverter reverses the modification of the n-state reversible inverter. The combination of n-state reversible inverter with corresponding reversing inverter is the identity. An n-state inverter may be a combinational circuit, an addressable memory or a set of machine instructions. An example of a rule based reversible n-state inverter, for instance for input signals that have 100 or more bits, may be represented as an arithmetical operation: $inv(i)=a*i+b \mod-n$ with n being prime or i being relative prime to n or the * and +operation being defined over GF(n). Inverter rules may include reversible permutations, shuffles or interleaves.

The Finite Lab Transform machine operation is illustrated in FIG. 1. A computer device 100, which may be a programmable processor, an addressable memory or a custom switching device has inputs 108 and 109 and output 110 and is configured to execute an n-state operation, such as an operation represented as an addition or a multiplication over GF(n) or any other 2-input n-state operation. Both inputs are provided with identical n-state reversible inverters 101 and 102 with respective inputs 105 and 106. The output 110 is provided with n-state reversing inverter 103 with output 103 which reverses 101 to identity. FIG. 2 is a screenshot of a Matlab program that generates a reversing n-state inverter and FIG. 3 is a screenshot of a Matlab program that performs an Finite Lab Transform (FLT).

Several cryptographic operations are recognized. 1) reversible encryption usually coupled with decryption; 2) one way encryption; 3) hashing; 4) authentication; 5) digital signature generation and verification. All these operations (also sometimes known as primitives) generally include exchange of information between two machines or part of machines, such as processor and storage medium.

Aspects of the present disclosure relate to "public key generation." The "public" in "public key generation" herein means that data related to a key, which is secret, takes place over a public channel that can be accessed, surreptitiously or not, by an attacker. It is recognized that there are different methods to establish a common key. In a Diffie Hellman (DH) process two machines exchange different data that allows both machines to create a common keyword. Another way is that one machine creates a keyword that is encrypted and transmitted to a second machine using for instance a public key from the second machine, such as in RSA. In Post Quantum cryptography key encryption and/or DH exchange may include a Key Encapsulating Mechanism (KEM). The term "public key generation" and related terms are used to mean all cryptographic processes that intend to create a secret key that is established between two machines and then used to further encrypt a message that is exchanged. The term "public key generation" thus covers for instance DH, RSA, ElGamal, Isogeny based DH, SIKE, Classic McEliece, NTRU, lattice based encryption, GGH encryption.

Digital signatures operations also include exchange of publicly transmitted data. It usually involves a public key and a signature of a document transmitted from a first to a second device. The second device may verify the signature by applying the public key to the signature to find a verified authentication such as a hash of the document. In a variant there are zero-knowledge schemes that are based on certain challenges. The term "digital signatures" herein is fully intended to cover all possible signature and identification machine operations.

Basic cryptographic operations are often considered as primitives and are designated by a name of their developer(s) or abbreviation and/or may be considered to be exemplary representations of an approach. Examples are Diffie-Hellman, ElGamal, RSA, McEliece, Schnorr, NTRU, LWE, Fiat-Shamir and Feige-Fiat-Shamir, and so on, which may all be modified in accordance with one or more aspects of the present invention as disclosed herein. For instance isogeny based public key exchange has SIDH/SIKE but also variant CSIDH. NTRU comes in different flavors and so does McEliece. Referral to such a name herein refers to a basic and identifiable operation or sets of operations that is part of a cryptographic operation. For instance DH, ECDH and SIDH all use at least the exchange of partial components between machines that in combination generate identical secret keywords. DH is distinctly different from RSA. McEliece is distinct from NTRU. One of ordinary skill knows what these distinctions are. If confusion exists then a name refers to in order: 1) a most recent specification in the NIST PQ program; or if the name does not exist in that program then it refers 2) to a cryptographic method and/or circuit described in a publication that admits it is related to, similar to or derived from a published original disclosure with such a name or designation.

One approach in creating a common and secret keyword is to find some intractable processing problem that is very hard to attack without access to some private keys. In accordance with an aspect of the present invention, each machine has one or more common n-state inverters or n-state inverter rules that are synchronized in use so two machines use the same inverter or inverter rule in a message exchange. Synchronization may be organized by a third machine, or by one of the two machines, or may be rules by a common rule for the two machines. A simple toy example. Each machine has 100 or 1000 or any other useful amount of different n-state inverter rules or n-state inverters stored in memory in a same order. Each stored inverter may have a unique, but to the outside world, meaningless, ID code. Meaningless means that no order of a code can be derived from the code.

When a data exchange is started, one of the machines selects a code from the series of codes and sends it to the other machine. Now both machines know which inverter or inverter rule to use. Preferably, a code and thus the corresponding inverter or inverter rule is used a limited number of times, after which a machine activates a new code and thus a new inverter or inverter rule. An inverter or inverter rule may be used only once and then be changed or k pre-set times and then modified or changed every hour, day, week or every pre-set time.

The machines have a common proof-of-work rule that both have to execute to arrive at a common keyword. This may be called a common expression rule. The common expression rule may be represented by a polynomial expression like $a0+a1*x+a2*x^2+\ldots ak*x^k$. Preferably, the expression includes at least one multiplicative inverse term like $ap*x^{-p}$. In one embodiment of the present invention a rational function of the form $(a0+a1*x+a2*x^2+ \ldots ak*x^k)/(b0+b1*x+b2*x^2+ \ldots bp*x^p)$ with preferably irreducible polynomials is provided. In one embodiment of the present invention one may use $(a0+a1*x+a2*x^2+ \ldots ak*x^k)/(b0+b1*y+b2*y^2+ \ldots bp*y^p)$ wherein two variable are applied. In one embodiment one may apply an expression with multivariate components such as $c_i*x^p*y^k$ or $c_q*x^p*y^{-k}$ or $c_r*x^{-p}*y^k$, or any arithmetical modification, including square roots, or other roots, inverses or powers of constants and the like. Expressions may be stored as secret expressions in a way similar to inverters or inverter rules.

In according with an aspect of the present invention, expressions may be published as public keys. One condition may be that a certain amount of work is needed to generate an outcome of an expression in unmodified operations over modulo-n or GF(n). This has as a consequence that brute force attacks, wherein an execution of an expression requires Ci processor cycles an attacker would need to spend in the order of Ninv*Ci cycles to break the common keyword, wherein Ninv is roughly the number of possible n-state inverters or inverter rules. Thus the public key may contain the expression, including all coefficients, and the required unknowns and may include the code for an inverter or inverter rule, if needed for synchronization. The execution of the expression may take place by FLTed operations by both machines. The factor n as in modulo-n or GF(n) and GF(n=$p^q$) may be published, but may also be kept secret as part of the n-state inverter or inverter rule.

In accordance with an aspect of the present invention the FLTed square root of a modulo-n number is applied to generate a cryptographic message, or a common keyword that is part of or processed in a cryptographic message. One may, if so desired even form a common keyword from the square root. There are several methods to develop a square root over GF(n) or in a composite modulo-n. These methods are documented in the known literature. For relatively small values of n, such as n<10,000 or n<$10^{12}$+1 or n<$10^{20}$+1 or any n that is considered relatively small compared to a machine on which a square root over GF(n) or modulo-n is determined. For instance 30 minutes processor time for computing a square root may not be desirable when the processor is needed for other tasks.

A naïve way for determining a square root is to find an x for which $x^2$ mod-n or over GF(n) exists. One can make the decision to only use the positive roots. There is a well known square root program for n=3 mod-4 and a slower program when n=1 mod-4. One first checks if the Legendre Symbol $(x^{(p-1)/2})$ is 1 (or Quadratic Residue) and the compute sqrt(c)=$c^{(p+1)/4}$ in Zp. One may do the same operations under FLT but with $x^{(p-1)/2}$ is not 1 but rinv(1) wherein rinv is the reversing inverter of the FLT. The square root is determined as sqrtFLT(c)=$c^{(p+1)/4}$ under FLT multiplication.

Take GF(47) and c=18. The Legendre symbol of c is $18^{(47-1)/2}=18^{23}=1$, so the square root exists and can be computed with the above steps as: sqrt(c)=21, which can be easily verified. Use an FLT over GF(47) with inv(i)=23*i+17 mod 47. This has a corresponding reversing inverter for which rinv(1)=32. Compute $18^{23}$ under FLT which is 18 ⊛ 18 ⊛ . . . ⊛ 18 (22 times) wherein 0 is the FLT of * mod-47. The result is 32, so 18 is a quadratic residue under FLT. Using equivalent $18^{12}$ generates 6 as the FLT square root of 18.

Isogeny Based Cryptography

The Costello article: Craig Costello, Supersingular isogeny key exchange for beginner, Microsoft Research, USA is incorporated herein by reference. This article provides a 431-state Elliptic Curve isogeny based key exchange. P=431. The finite field is for n=k1*r+k2*i as Gaussian integers. And the Montgomery curve $y^2=x^3+ax^2+x$ with a=329i+423 and generator points Pa=(100i+248, 304i+199); Qa=(426i+394, 51i+79); Pb=(358i+275, 410i+10) and Qb=(20i+185, 281i+239). Selected private keys are ka=11 and kb=2. Because p=$2^4 3^3$−1 Alice has to perform 4 isogenies on Pb and Qb and Bob 3 isogenies on Pa and Qa. Alice generates public key PKa=[423i+179 (isogeny of a), (142i+183, 119i+360) (isogeny of Pb); and (22i+314, 289i+10) (isogeny of Qb). Bob generates public key PKb=[273i+76 (isogeny of a), (187i+226, 43i+360) (isogeny of Pa); and (325i+415, 322i+254) (isogeny of Qa).

Alice uses public key of Bob, Bob uses public key of Alice to both perform isogenies to generate an=[230] and j-invariant [234].

Create an 431-state inverter inv(i)=19*i+270 and the corresponding reversing 431-state inverter rinv(i) wherein inv(rinv(i))=i. Modify all parameters with rinv, including the operations over GF(431) applied to $F_{p2}$. This creates terma=[298i+371] for the inverted parameter 'a' in the Montgomery curve. And the rinv inverted curve points Par=[354i+203, 274i+87], Qar=[167i+188, 238i+58], Pbr=[50i+91, 393i+82], and Qbr=[191i+177, 114i+384].

Using the same private keys ka=11 and kb=2 and the same number of isogenies but using the FLTed operations in accordance with 'inv' and 'rinv' will generate the following public keys KAflt=[271i+154, (84i+313, 161i+171), (383i+25, 84i+76)], and KBflt=[227i+262, (41i+406, 351i+345), (139i+53, 343i+226)] which is used by 2 machines to generate common curve term [258i+134] or common j-invariant [258i+293]. As one uses the reverse inverter to get from clear to FLT, the inverter inv is used to get from FLT to clear. And inv(258)=0 and inv(293)=234 which was the clear result of the DH isogeny computations.

The generated public keys in FLTed form are the rinv inverted versions of the open or clear versions of the public keys. Because ka and kb are private keys it is believed to be very hard to reverse engineer the results. However, if one applies the FLT as described above, it may be beneficial to operate publicly in clear mode on starting parameters and points and apply the secret FLTed multiplicative inversion for public exchange. This prevents an attacker from finding cribs on the inverter or inverter rule. However, if it is unlikely for an attacker to find the ka and kb for an open isogeny based DH operation it is even more unlikely to find it for an FLTed system. Furthermore it is highly unlikely that the secret FLT will be broken. One simple precheck is to compute if provided points are on a curve. If not, it may be an indication that an FLT was used. However, this doesn't help an attacker much as now both the secret key and the secret FLT have to be found.

Isogeny Based Key Exchange

One problem with key exchange systems like SIDH/SIKE is that they work from the same public keys. In case of SIDH/Sike both parties use the same starting curve E0 ($y^2=x^3+ax^2+x$) and the same initial points and the same value of n=$f*2^{e2}*3^{e3}±1$. The "customization" herein is the selection of 'multiplication factors" ka and kb to create the first and thus following isogenies. The Costello article provides the starting curve for p=431 being a=229i+423 and initial points pa=248+100i, 199+304i; qa=394+426i; pb=275+358i; qa=394+426i, 79+51 i. In the general literature the real and imaginary points in Gaussian integers are exchanged. In general points are represented like pa=100i+248. However, for calculating purposes in for instance Matlab the x and y coordinates of points may be represented by two coordinates each [real imaginary] and in origin 1.

This means that pa=[249 101 200 305] being [xpa ypa] and xpa=[249 101] and ypa=[200 305]. The factor 'a' in $y^2=x^3+ax^2+x$ in a p-state Montgomery curve is then a=term=[424 330] in Matlab.

In accordance with an aspect of the present invention, a cryptographic operation, including key exchange, encryption, digital signature and message digest is modified so it is privatized or customized so it is only useful for computers that have the custom or private parameters and the modified methods are more safe and secure than de cryptographic methods that they are derived from. In accordance with an aspect of the present invention, public data such as public keys between machines are enciphered as FLTed multiplicative inverses. Characterized by $kp \circledast kpf^1 = onef$, wherein kp is a public key, $\circledast$ is the FLT of n-state *, $kpf^{-1}$ is the FLTed multiplicative inverse of kp, and onef is the one-element (or neutral element) of $\circledast$.

The Costello article explains and provides a relatively small example (p=431) of a Diffie Hellman isogeny based key exchange. The method starts with calculating p as $p=2^{eA}*3^{eB}-1=431$ wherein eA=4 and eB=3. This means that A (=Alice) has to perform 4 2-level isogenies (factor 16, 8, 4 and 2) and B (=Bob) 3 3-level isogenies (factor 27, 9 and 3). Initial points pa and qa of order 16 and pb and qb of level 27 are determined as a basis for further computations. The NIST submitted version SIKE of SIDH specification is Supersingular Isogeny Key Encapsulation, Oct. 1, 2020, downloaded from https://sike.org/files/SIDH-spec.pdf and is incorporated herein by reference. How to determine generating points is provided in section 1.3.3 of this specification. SIKE uses as curve $y^2=x^3+6x^2+x$ or with term [0i+6] or in Matlab [7 1]. For instance for term=[7 1] and p=431 one finds base points P2=[177 191 237 130]; Q2=[108 307 131 403]; P3=[152 1 357 1]; Q3=[313 1 1 429] in [r1 i1 r2 i2] origin−1 notation. For p=863 one determines for term=[7 1]: pay=[40 27 291 476]; qay=[768 70 680 672]; pby=[224 1 860 1]; qby=[625 1 1 427].

In accordance with an aspect of the present invention one or more additional initial conditions for a key exchange procedure are stored in a memory for two devices, a status of the starting conditions between the two devices being synchronized so that both devices apply the same initial conditions. In the Costello article and elsewhere one or more graphs are used to illustrate the working of an isogeny based key generating procedure. The vertices of these graphs are commonly the so called j-invariants of the terms that determine the elliptic curves of the isogenies. The formula for a j-invariant is provided for instance in the Costello article. However, the curves and the point generation in isogenies are determined by the terms of the elliptic curves. For instance the starting curve in the Costello article has term a0=329i+423 or j-invariant j(Ea0)=87i+190. For computation of the isogenies the terms should be used. Some intermediate curves in the 2-level isogenies in Costello are for instance: a1=275i+132 and a2=273i+76 with corresponding j-invariants j(Ea1)=107 and j(Ea2)=344i+190.

In an article Christopher Leonardi A note on the Ending Elliptic Curve in SIDH downloaded from https://eprint.iacr.org/2020/262.pdf and which is incorporated herein by reference, explains that isogenies in a SIDH/SIKE protocol, especially when de isogenies are of a degree 2 and 3, ends not only on identical j-invariants but actually on the same and identical curves. This aspect will be used.

If one starts an isogeny based key exchange, it is desirable that both devices (named Alice and Bob) start with the same curve and common initial points. For instance, in the small toy example in the Costello article, both the 2-level isogeny public key generation (Alice) and the 3-level isogeny public key generation, go through vertex with j-invariant 344i+190 which is an intermediate point for Alice and the end-point for Bob for public key generation. This j-invariant in both cases is based on term ac=273i+76 with point Pa'=(187i+226, 43i+360), Qa'=(325i+415, 322i+254) generated by device Bob and Pb'=(274i+251, 318i+59) and Qb'=(214i+94, 354i+193). This will generate common secret key (209i+118) which is not on the path of either Alice or Bob in the original example. This illustrates that it is beneficial for security to use different initial conditions for common key generation. Using stored and non-published initial conditions will greatly improve security, because an attacker only has the exchange of public keys to work with.

In accordance with an aspect of the present invention, a series of curves that are part of a valid isogeny graph are computed. For large values of p, no common shared curves may exist or very difficult to find. However, each one of all possible curves crossed during isogeny computations may be applied as a common curve. To limit initial point and term computation, one may run through an Alice (or a Bob) isogeny and designate one of the intermediate curves as a starting curve. Alice will automatically provide Bob's related initial curve points Pb' and Qb' and if Bob is applied Pa' and Qa'. In that case only one set of corresponding points for Bob or Alice has to be determined. One may store for instance 100 or more, or 1000 or more or 1,000,000 or more initial curves and related generating points in synchronized memories.

In accordance with an aspect of the present invention, both devices thus have a list of secret initial conditions in a same order. One machine may provide a public index of the list to the other device so both will use the same initial conditions. One may also store a formula on both devices that operate modulo-k for instance when k initial conditions are stored. For instance assume 101 initial conditions are stored. One may use as expression $(g)^h$-mod 101 with secret g and k=101 wherein g is a generator element and one machine provides h, on which basis initial conditions in secret ordered position $(g)^h$-mod 101 is activated. Preferably an specific value hi for h is used only once or once in at least k times or k/2 times or in only a few times so that no pattern can be determined. Because all initial conditions are secret, all information has to be derived from the public key exchange in the SIDH/SIKE procedure.

In order to further protect security of key exchange, one may modify public key information in accordance with the FLT. If the amount of public key data warrants this it may be beneficial to apply a reversible n-state inverter to encode the public key data. This may apply to the isogeny computer public key exchange. One may also maintain on both computing devices one or a list of two or more p-state reversible inverters. SIDH/SIKE starts always in curve $y^2=x^3+6x^2+x$ according to its specification with preset generating points and 2-level isogeny factor eA and 3-level isogeny factor eB. If one sticks to the same curve, it has limited use to apply the n-state reversible inverters on the initial states, but would be beneficial to encode the isogeny generated public keys. These inverted states are then reversed by the reversing inverter at the receiving side. Additional security comes for selection of secret multiplication factor Na for the Alice machine and Nb for the Bob machine. However, if one uses one of multiple possible starting curves and generating points then inverting public starting conditions may be helpful. There is a relation between starting curve and related generating points. In accordance with an aspect of the present invention, one applies at least two different p-state reversing inverters (or p-state inversion rules) for inverting public data. For instance a first p-state reversible inverter for the curve term and one for the generating points. More preferably one uses different p-state inverters for the Alice points and a different p-state inverter for the Bob points. Even more preferably one uses a first reversible p-state inverter for the real component of the first generator Alice point, a second reversible p-state inverter for the real component of the second generator Alice point, a third reversible p-state inverter for the i-component of the first generator Alice point, a fourth reversible p-state inverter for the i-component of the second generator Alice point, etc.

The above modifies the working of the computer in an unconventional way. It provides an extremely high level of security in Diffie-Hellman (DH) key exchange. While it is applied to isogeny based Diffie Hellman key exchange one may apply it with appropriate adaption to any key exchange procedure. For instance one may encode generator elements and/or public key elements in classical DH key exchange, and in elliptic curve DH exchange.

In certain cases it is impossible or undesirable to store and/or synchronize custom data. In accordance with an aspect of the present invention one uses a SIDH/SIKE procedure for instance with initial data for curve $y^2=x^3+6x^2+x$ as published in the specification or determined and published by a network connected machine. One preferred condition is that the end condition of the isogeny based DH procedures not only ends on the same j-invariant but also on a same curve. Security of the method/procedure is created by the secret private keys Na and Nb and the large size of p. The initial generating points have order Alice $2^{eA}$ and Bob $3^{eB}$. In the Costello example eA=4 and eB=3 and Alice points have order 16 and Bob's generating points have order 27. During the isogeny process each point that is mapped during the isogeny diminishes in order. Points of lesser order are annihilated during multiple isogeny steps. Furthermore, Bob's points are left initially unmodified in order during Alice isogeny and Alice point are order constant during Bob isogeny. However, the public points lose in order once they get into their base isogenies.

In accordance with an aspect of the present invention, an initial curve point is determined with an order at least as great as a Bob or Alice order and preferably greater than that order. For instance determine a points that is not a multiple of Bob or Alice and has an order 100 in the Costello example. This point is a common point to both machines Alice and Bob and is public or secret. Assume it to be public. In a first step Alice and Bob go through the SIDH/SIKE isogeny and public keys are published. In a second step only the new common point of high order is published and is moved through the isogenies as required in SIDH/SIKE and its public key result is published. The public key is applied in shared secret key computation and the computation ends at the previously computed end state and j-invariant. However, the computation in the selected isogenies ends at the same curve and thus the isogeny moved the public point in both machine and generates the same secret point on the shared end-curve. Both the Alice and Bob machines already have the required public keys and no key exchange (unless Na and/or Nb are changed) on the isogenies are required. Only the public key for the isogeny on the single point has to be published. The new shared secret is based on the shared common curve point (and not on the curve).

A toy example using the Costello toy example. The Costello example uses Na=11 and Nb=2 for respectively the 2-level (Alice) and 3-level (Bob) isogenies. The generated and transmitted public keys (Bob computer receives and stores (423i+179, (142i++183, 119i+360), (220i+314, 289i+10) generated by Alice and Alice receives and stores (273i+76, (187i+226, 43i+360), (325i+415, 322i+254)) generated by Bob. Using the combined SIDH isogenies on point X=[100i+4, 76i+145] will generate Y1=[139i+46, 15i+412] at Alice and Y2=[139i+46, 416i+19] at Bob. One can see that Y1=-Y2 or when Y1=[x, y] then Y2=[x, -y]. Alice and Bob may use only the x-coordinate of the common endpoint. In addition, a rule may require that one of the parties inverts the y-coordinate. In that case both parties may use both the x- and y-coordinates as a common key or as the base for a common keyword. It is believed that using a separate point (separate from being a generating or base point) to carry through 2 multi-step isogenies to generate a common keyword is novel.

As a toy example, the Costello example is modified to p=863 thus enforcing a 32-step isogeny for Alice (as compared to 16-step isogeny for Alice for p=431). Using the SIDH/SIKE phase 3 procedure for generating base points, the following points, using from here on the [xr xi yr yi] notation using Matlab origin-1, with starting term [7 1] and points P2=[40 27 291 476]; Q2=[768 70 680 672]; P3=[224 1 860 1]; and Q3=[625 1 1 427]. Using ka=5 and kb=21 will generate end-curve in SIDH with common term [763 450] and end j-invariant [759 241. Both the Alice and Bob machine use the above starting curve and points and ka and kb and further carry through till the end curve one of the starting points, for instance P2. This will provide as end point for the Alice machine the point AA=[440 301 60 364] and the Bob machine BB=[440 301 805 501] which have the same x-coordinate and opposing (negative) y-coordinates. Both points are on the end-curve and have order 32. Carrying through the Q points have as result end points with order 27. One may thus use at least the x-coordinate as common key. And/or use the y-coordinate wherein one party is designated to change the y-coordinate modulo-p.

In accordance with a further aspect of the present invention, a starting point on the starting curve is selected with an order greater than $2^{ea}$ or $3^{eb}$ or any other isogeny order greater than the greatest term in $q^{eq}$ with q prime and that does not divide p. This starting selection forces all intermediate points during isogeny being on an isogeny curve. For instance a point XP=[132 435 357 115] is on curve [7 1]. Using valid terms ka and kb, for instance again ka=5 and kb=21, with generate as end points [749 237 48 735] on Alice and [749 237 817 130] on Bob.

Furthermore a very unusual and also novel aspect has not been disclosed elsewhere, it is believed. It is using point any point, for instance SP=[101 102 103 104], which is NOT on the starting curve [7 1] and will generate in p=863 SIDH the points [636 555 863 863] for Alice and [636 555 592 830] for the Bob machine, which are not on ending curve [759 241]. It turns out that a random starting point, using valid starting conditions, even when not on the starting curve will generate at least identical x-coordinates of a point on the end-curve in the SIDH isogeny common key generation.

For instance the point [121 207 403 774] on curve [7 1] with valid starting conditions using ka=5 and kb=21 will still generate end curve [759 241], of course, but the starting point after isogenies is carried to [419 386 863 863] for Alice and [419 386 97 593] for Bob and the x-coordinates may be basis for a secret key. All in origin-1 Matlab notation.

The above can be used in different manners. It is known that isogeny computations may take too long, while the exchange of public data may take too much bandwidth, which may be addressed by encapsulation and coding tricks.

Once a valid connection is established over a network between machines named Alice and Bob, it may be easier to re-establish secure connection in current sections, interrupted sessions or re-established sessions in a limited timeframe using previous data rather than going through a complete SIDH cycle. That is, establishing a common keyword is done by re-using the previous session parameters, but for security reasons using a new security starting point. For instance, one of the Alice/Bob machines may generate a common starting point SP=[xr xi yr yi] that is driven through isogeny as described above. All intermediate data are already known and may be retrieved from memory, so republishing, unless changed, it not required. This pertains in particular for the public intermediate data of the isogenies that may be stored and re-used. In the case of a SIDH protocol, this means that the Alice and Bob computer only publish the result of their local SP isogeny results. For instance, in the isogeny of SP=[101 102 103 104] Alice published public intermediate point [169 115 863 863] for use by machine Bob, and Bob publishes public key [121 138 747 486] for use by Alice. (all in origin-1 and [xr xi yr yi] notation.). For security purposes, these public key may be enciphered in FLTed multiplicative inverses.

In one embodiment of the present the Alice and Bob computers may store all intermediate isogenies (that is their kernels and perhaps terms) so that mappings for each isogeny of the keypoint can be computed without recalculating the kernel and curve term, as these already have been calculated previously. This can make computation of a secret common key lightning fast, if one makes all data for instance available through a cache memory.

In one embodiment of the present invention the two machines are provided with one or more sets of initial data for an isogeny exchange. For instance ka and kb are pre-programmed, as well as the generating points. In one embodiment of the present invention, the public keys related to for instance a SIDH/SIKE protocol are pre-computed and stored in the receiving machine. This prevents the machines from having to exchange the public key data. In that case one machine, which may be one of Alice or Bob or an external machine may publish a starting point that may or may not be on a curve. One may keep the starting curve a secret as well as p. Both machines use the published point to compute and then publish a public key which is then used to generate a new secret common key that is applied in further secure communication either directly or in a derived form.

A disadvantage of public key exchange is that public data still offers a (be it a very small and usually negligible) opportunity to derive the private key and/or the secret keyword. One way to address that is to publish upfront starting data and based on that determine a secret common keyword without additional intervening key exchange. Sticking to isogeny based key exchange or at least elliptic curve based key generation. One way to prevent intermediate or intervening data exchange is to make sure all data is generated after providing initial public data.

The more familiar or related two devices are, the better one can hide data or keep it private, ranging from the value p in GF(p) or mod-p, the generator or base elements G, G1, G2 etc. and the factors k for determining k*G for instance. An incidental connection of an unknown device that wants to connect securely to another device in a network, for instance under an TLS protocol is different from a chipcard user that charges to an account or wants to withdraw money from an ATM machine. In the first case almost no shared information is available a priori except the protocol for data exchange. In the latter case a chip is configured and some private information like a PIN is available.

In the first case a SIDH/SIKE protocol may be applied with public keys and exchange of public keys as in DH related protocols. In the latter case it may be assumed that as soon as one machine (or chipcard) is identified by the other machine, commonly shared data and protocols may be assumed and retrieved for which no data exchange is needed. To make sure that successful attacks, including stealing of data, is prevented or rendered moot, it may be beneficial to modify exchanged data per connection, even if the same rules are applied.

In the "unknown relationship" connection a full blown DH protocol is applied. This may be enhanced after an initial full SIDH/SIKE protocol with a reduced public data exchange by one machine publishing a single starting point on or off the starting curve, which is used to maintain or restore a connection by keeping all other starting data, including ka and kb the same, but deriving the secret shared key from the isogeny of the starting point. This includes an exchange of intervening public data.

One example: a wireless cardoor opener and a car based computer that controls the car lock. The cardoor opener is presumably in possession of an authorized user and is assigned or designated to a car. That is the cardoor opener, when activated, can unlock (and lock) one or more doors on a specific car. The car "knows" so to speak the cardoor opener and the cardoor opener "knows" the car and both controlling computing devices may have stored common data and computer instructions. In that case an incidental pass-by device should specifically NOT be able to open or unlock that car. Nor allow a malfeasant who wants to enter the car unauthorized. In that case a door opener and specifically a wireless door opener should provide a unique signal that works only once to instruct a device on the car to unlock the door. The signal should only work once so it cannot be picked up and re-used by an attacker. Furthermore, it should be impossible to interfere with a signal, for instance block it and then resend it to gain time to attack. Furthermore, the signals should be of an unspecified format (for instance a varying length) so an attacker cannot be successful in transmitting variants of a known signal format to try at random to influence the car computer to unlock the door. The example is initially directed at a cardoor. However, it is known that hackers are working on hacking autonomously operating vehicles, including cars, trucks aircraft and the like, to influence their performance. Accordingly, security is required for all forms of access to a computing device on a vehicle.

A first step to increase security is to use a system that does not require public key exchange between computing devices, perhaps after providing initial data. In accordance with an aspect of the present invention, both devices will perform operations on data that may be public but may also be kept private. For instance, both machine have access to an elliptic curve and have programmed instructions for processing data that is private or public. For instance, both machines have instructions to compute k*G. The private data may be the parameters of the elliptic curve, and/or the factor k and/or the point G. Private data may be stored in an ordered way at both the Alice and Bob machine for different computations of a secret common keyword. For instance, there may be 3 instances of a keyword computation:

Stage 1: n-value: p1 term=term1; factor=k1 generator=G1 code1 active:N]; Stage 2: n-value: p2 term=term2; factor=k2 generator=G2 code2 active:Y]; Stage 3: n-value:p3 term=term3; factor=k3 generator=G3 code3 active:Y];
Stage v: n-value: pv term=termv; factor=kv generator=Gv codev active: Y];

It should be clear that more than 3 parameter sets may be included. For instance there may be 100 or more sets of parameters, 1000 or more sets of parameters or one million or more sets of parameters. An arbitrary order is assumed in the stored set of parameters. Both machines may have the same order of parameters. No order can be derived from the individual parameters. A unique identifying code may be included with the set of parameters. In accordance with an aspect of the present invention, a parameter set is retrieved at each machine in its order of storage. An external event, such as a date, a time, or an external instruction may instruct each of both machines which of the parameter sets to use. One field associated in the parameter set indicates if the set is active. The above example shows that set associated with code1 is no longer active. In a data management step the active code may be changed from Y to N. In a follow on step, the memory elements associated with the parameters marked as Active:N may be further deactivated by overwriting the memory with for instance all 1 or all 0 or any pattern that overwrites the content, or at least the operational parameters term, factor and generator. Once the parameter set is marked as Active:N it cannot be used in an actual computation.

In one embodiment of the present invention a line in a plurality of parameters sets may be activated in one machine. For instance, a computing machine may be a door opener with an activation button or interface. Based on the activation signal, preferably at random, but stepping through a stored order is also contemplated, a specific line or parameter set that is active is activated. The code of the parameter set is retrieved and is transmitted to the other machine and received by the other machine. Based on the received code the other machine retrieves and activates the parameter set associated with the received code. At the appropriate time, the parameter sets in both machines are de-activated and made impossible to be used again. This prevents that a malfeasant steals a signal and surreptitiously applies a parameter set to attack a machine. In one embodiment of the present invention, the code is transmitted but strictly in order of storage. Imagine a user accidentally presses an activation key while being out of contact with the other device or out of reach/distance. This means that a specific parameter set is activated in one device but not in the other device. The next time the first device is activated while being near to the car, appropriate signals are transmitted and received. The receiving device, while checking the order and position of the received codes will determine that one or more intervening codes were not used and will be de-activated from future use.

In each parameter set different factors may be stored and different generators and even different value for p and different terms for elliptic curves. Both machines have the same computation instructions for point addition and point doubling on an elliptic curve. For illustrative purposes a Montgomery curve is used. But others like Edwards and Weierstrasz and others may be used. One may use straight forward Fq finite field computations or apply Gaussian integer representation points, as long as both machines use the same parameters. Under the above conditions both machines will generate the same end-point k1*G1 over GF(p1). The point G1 even doesn't have to be a curvepoint.

In addition to the above one may store in the set of parameters an q-state reversible inverter or a q-state reversible inverter rule wherein q matches parameter n-value p. The q-state inverter may be used to invert the secret common keyword before it is further processed, such as hashed. The receiving machine may be provided with the corresponding reversing q-state inverter or inverter rule. Both machines may also apply the reversible k-state inverters that modify the hashing or encryption methods in accordance with an FLT as described and disclosed earlier by the inventor. The receiving machine is preferably provided with the same inverters or reversing operations.

Both machines may also implement a knowledge free exchange such as a modified Fiat Shamir method or heuristic (FSH), for instance as explained in https://en.wikipedia.org/wiki/Fiat-Shamir_heuristic which is incorporated herein by reference. In the Feige-Fiat-Shamir ID (FFSID) scheme as explained in https://en.wikipedia.org/wiki/Feige-Fiat-Shamir_identification_scheme, which is incorporated herein by reference, the public exchange of data may be enciphered using n-state inverters as explained herein. One may also modify the computations of public data in accordance with an FLT. Also signatures based on FSH and FFSID may be modified in accordance with methods and/or operations as disclosed herein.

The above computer procedures use preprogrammed data. Though the machines step through difference configurations, all data is pre-programmed and changes only when a new set of parameters is activated. In accordance with an aspect of the present invention both machines work without exchange of data, but are both provided with initial information. This information may be provided by a third trusted machine on a network. This machine may have at least the codes stored that are associated with parameter set. One of the first two machines transmits the code of an activated set of parameters to the other machines. The third and trusted machine retrieves or computes one or more common parameters, like the factor or the generator or the curve, that allows the first two machines to compute their secret common keyword.

In a variation of the above one of the Alice or Bob machines generates from computations or retrieval an appropriate parameter to be shared with the other machine. In accordance with an aspect of the present invention, a specific reversible inverter is associated with a code and thus with a parameter set. One of the machines inverts the public data with the reversible inverter and publishes it. The other machine receives the inverted data and reverse inverts it to generate data that is used in computations.

Returning to isogenies. The stored parameters sets may also relate to parameters of isogenies for instance as a complete or a partial SIDH protocol. For instance if p is composed of terms that are powers of 2 and 3, a limited isogeny, for instance only a degree 2 isogeny is computed. In SIKEp434 the exponent e2 for 1=2 is e2=216. While SIDH has of course two different degrees isogenies, in this case for two machines using private common data one may limit to one i-degree isogeny. In that case the generated secret common keyword may be any generated state of the isogeny. It may be the term, a generated point or the j-invariant of the term. For instance the point [101 102 103 104] which is not on the Montgomery curve with term [7 1] (or 6 in SIDH/SIKE) generates a point [282 110 59 112] on curve [421 390] using ka=11 kb=2 and the earlier provided generator points at the end of the public key generation part of SIDH for p=431. However, one may also use the result of the next to last isogeny step, which generates a curve with term [319 97] and a point [207 306 157 234] which is not on the curve as a result of [101 102 103 104].

One may use any generated isogeny data as long as both machines perform the same computations, even if starting points are not on a set curve. To make the process operate on not stored data, one device may generate preferably at random a point that falls within the requirements of each element being smaller than p. Though such a random point may not be on a curve it will still generate a proper and usable output. One may also provide a number of the SIDH step that a result has to be taken. For instance in p=431 that number cannot be greater than 4 for the degree 2 'public' part isogeny (even though that part in this variant is kept secret). For p-863 that parameter cannot be greater than 5. However, each of the generated result after the first isogeny step may be used as long as both machines apply the same parameters. In fact the isogeny based formulas including the Velu derived formulas in this case are merely modulo-n or GF(n) cyclic operations and within broad limits provide a useful result as long as both machines apply exactly the same steps and same input values.

In accordance with an aspect of the present invention the entire SIDH procedure is implemented on both the Alice and Bob machine. Both machines thus have access to ka and kb and all required points and terms. Any random point with coordinate elements <p and even those not on a starting curve may be used as a published point and may be provided by a trusted machine on a network. In case of each machine performing the entire SIDH protocol, in one embodiment both machines perform the 3 degree isogeny (originally assigned to Bob) on the $2^{eA}$ order points. Furthermore, the Bob part still performs the multiplication of $3^{eB}$ order points to get to the base point that is used to determine the kernels of the isogenies. This generates the points and curve that originally would be provided as public key data. A next set of instructions takes the generated key data and performs the steps in accordance with the $2^{eA}$ order steps. This ends with generating the end curve and if so desired the computed points based on the isogenies.

One of ordinary skill would understand that one may also reverse the order of steps: first do the order $2^{eA}$ isogenies to generate intermediate data that is then further processed by the $3^{eB}$ isogenies to generate the same curve, j-invariant and if applicable a computed point. The advantage is a very intricate and largely intractable cryptographic method that is hard to attack if no or limited data is published. For instance using as only public data a p-state point in $F_{p2}$ with x and y coordinate [xr xi yr yi] that is not on a specific curve will generate an irreversible result that may be further hidden by using a e-state reversible inverter.

Because both machines perform both the 2 and 3 degree isogenies, no data has to be published and both machines will generate the same data, of which data elements generated during each step may be used. The random input point may also be provided by one of the Alice or Bob machines.

In case of unlocking a mechanism or activating/unlocking a database or computing device, both machines have created a secret common keyword. An "opening" device or a device that seeks access has to inform the device that needs to be unlocked or accessed that the opener has the same secret common keyword. If so desired a Fiat Shamir zero-knowledge procedure may be used. However, this is usually an interactive process. It may be made non-interactive. In one embodiment, a code and possibly enciphered (possibly by inverter) are packaged in a single frame or multiple frames that are transmitted from opener to the to be opened device. The packaging is such that there is realistically no opportunity to separate code from keyword or enciphered keyword. That is, an attacker cannot stop a device from part of a signal that is only the key. The code alerts the receiving device what is coming. If so desired, one may send the code separate from the key or enciphered key. If they are not separated, the receiver may store the entire received frame or frames, separate the code from the key or enciphered key. Using the code, specific parameters are retrieved associated with the code. A public key may be part of the frame. The receiving device generates the key, it may decipher an enciphered key or it may encipher its own generated key, for instance via hashing and for instance compares deciphered received key with generated key or the received enciphered key with the locally enciphered generated key. When they are identical the device is unlocked, a lock is unlocked or access is given to a database or a locked device or protected device.

In accordance with an aspect of the present invention a point (be it on a curve or not) may be included in a frame in open or enciphered form to be used to compute an exit point of which at least the x-coordinate(s) will be used to determine a common keyword. In one embodiment such a point may be provided in open or enciphered form as a separate signal. In one embodiment an isogeny has already been determined. In that case the SIDH protocol may be re-used and only the entry point is the variable and may be provided to both machines from for instance an independent source or may be provided from one machine to another one. Such a point may be determined at random or may be stored. In one embodiment such points may be part of a parameter set and do actually not have to be transmitted from one machine to another one as they are retrieved from the parameter set that is activated.

Very fast executions of complete SIDH/SIKE key exchanges have been reported and speed of around 20 ms appears to be very achievable and worst case of below 200 ms for SIKE751 earlier was reported on ARM Cortex-A72. For practical purposes, the above "opening" using part or all of SIDH protocol will take place within a single step of 200 ms or less. This means that one has a very fast and highly secure opening device. It can be made much faster by storing intermediate results and using starting points that are locally stored.

The SIKE protocol works with a well defined initial set of parameters, including the starting curve and curve points. Providing two or more different sets of starting points for the SIDH protocol which has starting curve $y^2=x^3+6x^2+x$, or term [7 1] in Matlab origin-1 representation, further enhances security. Earlier above a set of starting generator elements was provided for a=[7 1] and p=431. For instance another set of generator points of order 16: P1alt=[124 347 24 278] and Q1alt=[360 84 118 38] and degree 27 points P2alt=[200 211 202 280] and Q2alt=[30 259 75 180] with ka=11 and kb=2 will generate common end term [416 1] and common j-invariant [190 1]. A common entry point [100 101 102 103] which is not on the curve [7 1] will generate both for Alice and Bob machines the exit point [25 63 229 183] and [25 63 204 251] having identical x-coordinates which may be used as the secret key or as a basis for a secret key. This as compared to the earlier provided points which will generate end curve [3 86] and end j-invariant [242 1] and exit point [180 386 420 109] and [180 386 13 324] respectively having identical x-coordinates and are different from the output with other generator points. One may also change one of the two generator point sets, as long as mew points are also base generator points.

One may also modify the starting curve, preferably to a curve that is in the isogeny graph that includes curve [7 1]. A simple way to find such a curve is to take an intermediate result of the isogeny steps. For instance using the starting curve [7 1] with a set of earlier provided generator points will go through curve [319 97] in the level 2 isogenies. The order 27 points will keep that order through the isogenies and may be used as new generator points. In this example this results in point Pb27=[118 46 99 130] and Qb27=[197 369 303 62] which may be used for the new Bob machine generators for curve [319 97]. It is difficult if not impossible to predict what the isogeny intermediate states will be. So, one has to determine independently what order $2^{eA}$ generator points need to be. One can either determine the $2^{eA}$ generator points or $3^{eA}$ generator points from intermediate isogeny results, if at all possible. Or one can compute a pair of base points for the desired curve of desired order. For instance Pa16=[127 356 102 182] and Qa16=[21 179 267 9]. This will generate for ka=11 and kb=2 the end curve [255 184] with j-invariant [316 133]. A point hh=[100 101 102 103] not on the curve will generate point [266 57 276 290] for both branches of p=431 SIDH isogenies. This approach improves security and alleviates some of the required efforts and makes it much easier to switch curves.

In accordance with an aspect of the present invention one may also apply a point on the curve with order infinity, when applicable, to move through the isogenies. One may store and save on a memory or storage device the intermediate public keys. One may then take as an entry point PI, either a curve point that is on the starting curve as new public key with an order that is relative prime to 2 and 3 in SIKE/SIDH (or the 'base' orders of the isogenies, as in CSIDH). This generally means that the order of this point will not be affected or the point will at least not be annihilated during Alice/Bob isogenies. This means that both the Alice and Bob machines will generate as a result of executing the SIDH/SIKE and CSIDH protocol an end point that has at least identical x-coordinates. They will also generate (of course) each time the same end curve. Both Alice and Bob machines already have access to the intermediate keys which may be stored and may be retrieved. Thus, transmission of these intermediate keys, called sk2 and sk3 in the SIKE specification and $PK_A$ and $PK_B$ in the Costello article, is not needed. Only intermediate keys $PI_A$ and $PI_B$ as a result of first round isogenies have to be transmitted which is smaller than the initial intermediate key. Some literature uses the term "infinity order" for points that are unaffected by isogenies.

herein a point that is not on a curve is specifically defined as a point that order infinity on the curve. In accordance with an aspect of the present invention an entry point PI or initial point PI is selected for generating a secrete key in SIDH, and/or SIKE and/or CSIDH point that is not annihilated during isogenies in at least its x-coordinates or at least not degraded to a zero-point during isogenies. Thus a point PI may be of a specific order on the curve or may not be on the curve.

The Costello article demonstrates that in order to carry any point, including a point PI, through an isogeny one needs the formulas for isogenies φ(x) which depends on a kernel point. In a first round all individual kernel points have been computed and have been applied as parameters in computation of φ(x). Only φ(x) is required for each isogeny of point PI and re-computation of kernel points, curve parameters and isogeny of starting points is not needed as the useful result of those (the intermediate public keys) may be retrieved from memory if needed. Again, only kernel data is required to perform execution of φ(x) and only the intermediate result $\phi_A(PI)$ and $\phi_B(PI)$ needs to be computed and transmitted, assuming using the same initial starting data except for PI.

One may achieve secure exchange with much smaller representations for p if p is kept secret. For instance, the isogenies may be reduced to eA≈100 and eB≈65 or even eA≈50 and eB≈32 or even smaller combinations of (eA, eB) may be applied. Especially when the purpose is to only once unlock or open or access a device or database within a very limited timeframe, there is no benefit to extend security beyond what is required. When different sets of parameters are used, or at least one parameter (including an identifying code) there is no to limited benefit to attack the opening sequence as it will not be repeated and it may not be used to protect a message by encryption.

It makes a difference if an entry point that is either on a starting curve or not, if provided in an encrypted or clear text manner as a public key or as a private key stored as one of a parameter set. Preferably, if it is transmitted either in clear text or in encrypted form as a public key, all elements should be part of a single message, so attackers have limited opportunity to analyze. A receiver may be programmed with instructions to separate from a coded form message one or more public key elements embedded in a message. Such separation may not be clear from a message itself. For instance elements, such as bits or blocks of bits belonging to a specific parameter, code or key, may be embedded in a message by a predetermined interleaving or multiplexing and/or by different encipherments such as using different n-state inverters which as known to the devices.

A device that receives an above type message may store and process the message for processing and as soon as an element is detected that indicates that it is an opening or unlocking message may prevent a processor in the receiving device from storing and/or processing opening/unlocking data at least for a limited time, for instance until authenticity and/or validity or correctness of the message is determined.

If required and if warranted by sufficient lengths of messages, an identifying code and/or a parameter and/or public key may be transmitted by an requesting or opening device within a predetermined interval. It may be like an opening device transmitting to a receiving device a code for a lock, allow a receiving device to initiate and activate the lock and then have the opener transmit the key and allow the receiving device the opportunity to have a valid key to unlock or open the receiving device. In that case a receiving device may only allow a limited time between receiving the code and the key. For instance when a code is received, a to be opened device may allow preferably at most 5 minute, more preferably at most 1 minute, even more preferably at most 30 seconds, even more preferably at most 10 seconds, even more preferably at most 1 second, and most preferably not more than 1 second to receive a key message. This gives an attacker in most circumstances not enough time to prepare an attack. After the time is elapsed, the receiving device de-activates the parameter set associated with the received code and is ready to activate the next code in an ordered set of parameter sets.

In certain cases a very large number of key exchange efforts is expected with public key exchange to make sure that two machines are properly matched by data-exchange and storing of a lot of parameter sets or static data is to be prevented. For instance, an autonomous vehicle drops and reconnects often with a particular server on a network. In that case, it may not be necessary to do the fill SIDH/SIKE protocol, but use for a limited number of times a randomly generated point for instance as a basis to generate a common exit point that serves as the basis, for instance via hashing, as a secret reconnection code. In order cases, as little data as possible is desired to be exchanged and the number of possible connects/opening is limited, for instance to less than 1 million or less than 100,000.

Especially in certain cases, for instance wherein at least one device has not a powerful enough processor, it is desirable to avoid complex and/or time consuming computations. In that case it may be desirable to store as much data as possible on a memory, which may be a fixed memory or non-volatile memory from which data is retrieved and transmitted. The power of SIDH and even stronger for CSIDH is the circular commutative character of the key generation process. That is: two apparently separate processes both in time and in space will arrive at the same result by exchanging at least one time of public data.

One embodiment of the commutative property as stored states is illustrated in FIG. 4. There are two machines which are called Alice and Bob to keep in style with general naming in cryptography. Machine Alice has two memories or two parts of one memory or storage identified as 5100 and 5101 while Bob has a memory 5110. The memories are part of computing devices including memory control and management and processing circuitry. The machines have transmission and receiving circuitry, bodies, power supply and other equipment which is familiar to one of ordinary skill in mobile computer technology. In order to not obscure a working of the system these and other circuitry and equipment is not shown but should be assumed to be present.

An initiative for opening or activation starts from the Alice machine. However modifications that allow start from the Bob machine is fully contemplated. An activation step, for instance a user pushing or activating a button or other interface causes a processor to look for a next valid line in memory Alice 1 5100 to be activated. For illustrative purposes validity of a line is indicated by a column named 'valid' that carries a 0 (not valid) or 1 (valid). A processor may overwrite a line with valid indicator 0 so no useful states are present on that line. Line 2 is the first valid line and it has signal '1' in the column output. A signal representing '1' is transmitted to machine Bob and a memory line in 5110 represented by signal '1' is activated. One output signal '13' is associated with line 1 as well as common key '11033.' Machine Bob outputs signal '13' to machine Alice and retrieves a common key identified as '11033' as a common key. The signal represented by '13' is transmitted to the Alice machine. The Alice machine that receives a signal from Bon now activates memory or memory location 5101 and the memory line associated with signal '13'. A processor reads the memory content of line '13' and outputs common key '11033'. The common keys may have any format and any value as long as the they are unique from other common keys. One may also further process the common keys to generate a final key. However, it should be clear that both machines Alice and Bob in this scheme end up working with the same common keys. After using a line it may be disabled by switching the valid bit from 1 to 0 or by overwriting the line with all 0 or all 1 bits or with a meaningless pattern. Not specifically highlighted, one may check that line 3 in 5100 outputs signal '19' to 5110 where it activates output '15' to 5101 and generates common key '654' at 5110. Memory line associated with '15' in 5101 also output common key '654'. This has been made a 3-step generation. If so desired the number of steps may be expanded by having additional translation memories or memory parts.

Figure 5:
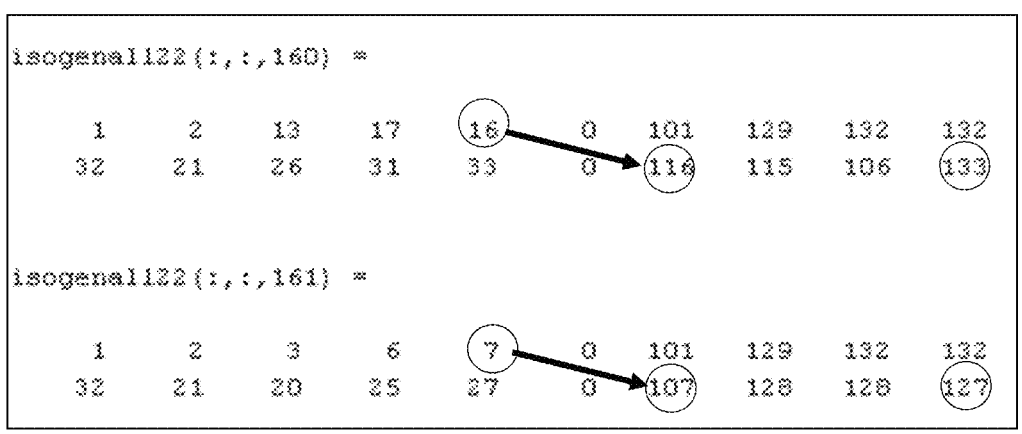
FIG. 5 is a screenshot of an output generated by a cryptographic device performing an isogeny based operation in accordance with an aspect of the present invention.

In practice it may be useful to have 100,000 or 1,000,000 different and unique memory states to generate unique common keywords. It may be difficult to achieve this manually. One way to fill the memories automatically is to use an isogeny based method. This is illustrated in FIG. 5. FIG. 5 is a screen shot of an output of possible isogeny states as generated by a SIDH protocol. In fact it is based on the Costello article example. Costello in his article mentions "the curse of the toy example." Because of the small value of p=431 in the example, the number of different j-invariants and even of curve parameters is small, 37 and much smaller than p. The number of different end-states for p is about p/12. For larger values of p or of eA and eB, the number of possible end states exceeds the number of computed end states. Thus for p≈100,000 and certainly for p≈1,000,000 there is little chance of duplications or collisions in SIDH. However, a program should check and drop any end state that already occurred.

FIG. 5 shows a partial table 5200 which is a small part of 175 outputs. The 2 line table isogenall22(:,:, 160) show a recoded output of a complete isogeny SIDH cycle for p=431 and for the generator elements and initial curve as provided in the Costello article. The inventor first did run all possible 175 (ka, kb) SIDH isogenies and stored all generated curves and renamed them. For instance state 1 is the starting curve in Costello indicated as a0=329i+423. The first line shows 5 numbers followed by a zero and then followed by 4 more numbers. The first 5 numbers are the 4 isogenies in Alice ending with 16, which is the public key which is represented by curve now designated as 16. The zero is meaningless and serves as a separation. The next 4 numbers are the Bob isogenies, also starting at 1. To distinguish with Alice it is named 101, but it is the same as Alice curve 1. The first stage public output of Bob is 32 named 132 to distinguish from Alice. The second line shows the second state isogenies in Alice and Bob using the public keys. So Alice starts with 32 (which was first shown as Bob's output 132) and ends as secret common curve 33. Bob enters public curve 16 from Alice as 116 and ends generating as secret curve 133 which is the same as 33. To highlight part of the process the public key of Alice to Bob and the secret key generation of Bob are marked.

The public outputs of Alice are associated with an initial state (for instance index 160 in this case). It generates 16 which may be used as an ID for a memory line in 5110 in Bob and provides an output 33 (or 133) The signal 33 is applied as an identifier in memory 5101. The secret curve or j-invariant associated with 133 or 33 may then be used as a common secret keyword. One may also apply a reversible k-state inverter wherein k may be much greater than p and wherein an additional number may be added to generate a keyword that depends upon the output state 133. By using the SIDH or any other isogeny based protocol and an adequate recoding of all possible or preferably all occurring begin, intermediate and end curves one may create a stored but highly secure key exchange system as illustrated in FIG. 5.

It should be clear to one of ordinary skill that the above may be modified so device 5110 only generates a signal for 5101 but does not provide a common key. A similar but mirrored process, using for instance first the Bob isogeny states or start with the second part of the first line in 5200 (after 0) that starts with 101 (being identical to curve 1) and ends with 132 or curve 32 out of 37. Signal 32 is transmitted from 5110 from Bob to Alice to a memory not shown in FIG. 5 that generates from Alice a signal 33 back to Bob. A separate and not shown memory in Bob then at position identified by 33 identifies a common key that is identical to the one generated by Alice. This is of course the SIDH mirror of the first process as illustrated in FIG. 4. One may take care that the second signals are recoded (for instance using different inverters) in a way so they are not identical in both processes. Other ways to modify interactivity are fully contemplated.

A way of limiting interactivity between machines is to compute isogeny intermediate and end curve data and associate them with a unique code. The unique code may be for instance created by hashing the curve data. The hashing may take place with an FLT modified hashing method such as FLTed SHA-2. The common keyword may be hashed with a differently FLT modified hashing algorithm, using for instance different reversible inverters. This may be done off-line, for instance to generate 1 million or 10 million unique codes with associated isogeny based keywords which are then stored in memories dedicated for Alice and Bob machines. One may also try to generate 1 or 10 million pseudo-random numbers. Using deterministic methods and devices may be easier to create hundreds or thousands of pairs of corresponding common key generators.

Herein the term curve or elliptic curve is used. An elliptic curve is determined by its parameters. An elliptic curve may be represented in its short Weierstrasz form equation. While one may different representations a common one is $y^2=x^3+Ax+B$. In cryptography the terms A and B are generally selected from a finite field Fp. As applied above, in isogeny based protocols such as SIDH Montgomery curves are popular, which may be represented as $By^2=x^3+Ax^2+1$. In SIDH/SIKE B is commonly set to 1 and in SIKE A may be 6 or [6 0] as Gaussian integer. So when in the context of SIDH/SIKE a "curve" is mentioned it generally means a curve $y^2=x^3+Ax^2+1$ with A an element [a1r a2i] wherein a1 and a2 are elements of a finite field Fp. So a curve in SIDH/SIKE means commonly an element A=[a1r a2i]. Thus a curve is identified by its parameters. A curve may also be identified by its j-invariant. However, a same j-invariant may identify two or more different curves.

An isogeny is a mapping of a curve including its parameters and points on the curves generally defined over a finite field or a finite ring onto another curve with different parameters and different points but still defined over the same finite field or ring with the O point on one curve mapped to the other curve. For instance a first Montgomery curve $By^2=x^3+Ax^2+x$ has an isogeny or is a mapping to curve $B'y^2=x^3+A'x^2+x$ both defined over a same finite field GF(p). Notwithstanding the fact that the curve parameters are defined over a finite field GF(p) the applied parameters of the curve may be Gaussian integers. That is, the parameters may have what are called a real and an imaginary parts such as a1r and a2i represented as [a1 a2] or (a2i+a1r). In general in mathematical representation the elements as well as curve points are said to be defined over finite field $F_{p^2}$. In processor based computation elements such as real and imaginary integers do not exist. While it may be convenient to name elements Gaussian integers, for computation it only means that parameters consist of multiple coordinates for which a computational rule for a processor is applied. A parameter of a curve may be [A1 A2]. Another element may be [c1 c2]. The computational rule says: [A1 A2]+[c1 c2]=[(A1+c1) (A2+c2)] and [A1 A2]*[c1 c2]=[(A1*c1−A2*c2) (A1*c2+A1*c1)]. The operations * and + are operations defined over GF(p). A point on a curve may be defined as [x y] wherein x and y may both be Gaussian integers. Thus a point on a curve over $F_{p^2}$ may be represented as [xr xi yr yi] and may have 4 coordinates in total for which the above computation rules apply.

In the literature on isogeny based cryptography, for instance in the Costello article, a notation is used that looks like a sum. For instance Costello discloses a curve with $a_0$=329i+423 and a point $P_A$=(100i+248, 304i+199). The '+' in this notation is for computer execution meaningless as no terms are added. The '+' serves merely as a separation character. Instructions in the instant disclosure are executed in Matlab, but may be performed in any viable computer language, assembler or machine code. Some operations such as addition and multiplication are FLTed. The FLTed switching tables may be used when n is relatively small, for instance n being expressed by 20 bits. If n is of intermediate size, for instance n being around 30 bits or smaller one may store the entire n-state inverter. Matlab operates in origin−1, and most operations herein are based on origin−1 switching tables. This demonstrates that no mathematical operation in performed in the FLT but merely a switching table with defined meta properties. Furthermore, to represent any element appropriately a notation [a1r a2i] and [xr xi yr y1] is applied for Matlab. This means that the above curve term $a_0$ is entered as [424 330] instead of 329i+423. That is in Matlab notation a 1 is added to all elements and i and r positions are switched and no artificial '+' is inserted. The point $P_A$=(100i+248, 304i+199) is used in Matlab as [249 101 200 305]. This is for programming purposes and makes no material difference to isogeny operations as described in the literature.

For computational purposes an individual isogeny or isogeny step, unless mentioned differently, is a mapping from a first curve to a second curve. There are several isogenies distinguishable in isogeny based cryptography. For instance SIDH/SIKE is an interactive public key generation method. It has two different sets of two stages. First of all SIDH/SIKE uses a $p=2^{eA}3^{eB}\pm1$ with p being prime. Alice (the A or Alice machine) performs eA complete isogenies or complete determinations of a mapping of curve parameters of one curve to another curve. A first stage includes mapping of curve points having order $2^{eA}$ and order $3^{eB}$ at the first isogeny. A combination of 2 initial points of order $2^{eA}$ are used to generate a third point of this order which is used to generate a kernel point. This kernel point is applied to find the parameters of the new curve. Velu's formulae or specific expressions thereof are applied to move starting points from a first curve to a second curve. The resulting points may be called image points and the parameters of the mapped curve may be called image parameters. Image points resulting from the first stage are published as public keys and are used by the A and B machines as next starting points in a repeat of the isogeny cycles.

The order of starting points $2^{eA}$ decreases with a factor 2 after each isogeny. The order of a point that is not divisible by 2 remains the same after isogeny or decreases slightly. This means that a point of order $2^{eA}$ can only be submitted eA times to a level-2 or degree-2 isogeny. In general a $\ell^{eX}$ isogeny wherein $\ell$ determines the base of the isogeny order is called the level or degree of the isogeny. Accordingly, when $\ell$=2 it will be called a level-2 or degree-2 isogeny. Some literature names the degree of an isogeny after the number of possible kernel points.

The Alice machine, which is arbitrarily associated with the $\ell$=2 isogenies, thus may perform up to eA isogenies. The Alice machines moves 2 starting points with order $3^{eB}$ through the eA $\ell$=2 isogenies, as well two generating points with starting order $2^{eA}$. At the end of eA $\ell$=2 isogenies image parameters are generated as well as two image points on that curve with image parameters, which may be published and are inputted to the Bob machine for eB isogenies. During the eA isogenies image parameters and image points are generated, which in SIDH/SIKE serve as intermediate and largely invisible results. A machine may be provided with instructions that stop the Alice process after Ki isogenies, wherein Ki<eA. The intermediate results of image parameters and/or image points may be used for determining keys or inverters.

For instance one may stop the $\ell=2$ isogenies after Ki=2 and use either a generated image point or an image parameter or a j-invariant or other derived parameter from such intermediate results for determining a secret key or a secret inverter. If the secret has to be shared or be the same without interaction, both the Alice and Bob machines have to be programmed with the same $\ell=2$ isogenies instructions and both stop after Ki isogenies.

The $2^{eA}$ order composite point in the $\ell=2$ isogenies is used to determine a kernel in each isogeny step. This point ends up as an order-0 point at the end of the isogeny steps and is thus effectively annihilated. However, during the isogenies one may still use the image points of the generating point for purposes of determining an inverter or a secret shared key.

The Bob machine is associated with $\ell=3$ isogenies. Due to the selected value of p, the order of starting points for the eB $\ell=3$ isogenies should be $3^{eB}$. After eB $\ell=3$ isogenies the isogenies are exhausted and all provided generating points in SIDH/SIKE are annihilated. The end state of the Bob isogenies is then the final image curve parameter, which generally is used to determine a j-invariant which serves as the shared secret key. In this process only the Bob machine has a secret key. Using the Bob machine as the first stage, generating after eB $\ell=3$ isogenies a public key of image points and an image curve parameter as input to the Alice machine allows the Alice machine to generate the exactly same image curve parameter as the Bob machine.

In accordance with an aspect of the present invention, a common entry point that has an order not divisible by 2 or 3 on the starting curve is submitted to the Alice and Bob isogenies in accordance with the SIDH/SIKE protocol. Both machines will generate a common image point at least with the same x-coordinates that can serve as a common key or may be used to compute a common key or a reversible inverter. Both machines perform different operations. Both machines may be programmed to execute exactly the same instructions. That is, both machine may be programmed to perform the $\ell=2$ isogenies or $\ell=3$ isogenies or perform a first set of $\ell=2$ isogenies followed by $\ell=3$ isogenies or perform first $\ell=3$ isogenies followed by $\ell=2$ isogenies. In those cases no interactive exchange of data is required. For instance both machine may perform Ka<=eA $\ell=2$ isogenies or Kb<=eB $\ell=3$ isogenies or eA $\ell=2$ isogenies followed by Kb<=eB $\ell=3$ isogenies or eB $\ell=3$ isogenies followed by Ka<=eA $\ell=2$ isogenies. One has to make sure that both machines use the same starting data.

In accordance with an aspect of the present invention, both machines are programmed with identical isogeny instructions with up to eA or eB isogenies. Based on a common signal or preprogrammed instructions both machines using identical input data perform Kx isogenies in $\ell=2$ isogenies or $\ell=3$ isogenies. This generates a common image curve parameter and image curve points based on Kx. If the common isogenies are $\ell=2$ isogenies then $\ell=3$ isogenies or $3^{eB}$ order image points and the generated image curve parameter for instance aim are generated that are used as secret starting parameters. Both machines then may use known methods to generate two $2^{eA}$ order generator points for curve parameter aim. If the common isogenies are $\ell=3$ isogenies then $\ell=2$ isogenies or $2^{eA}$ order image points and the generated image curve parameter for instance aim are generated that are used as secret starting parameters. Both machines then may use known methods to generate two $3^{eB}$ order generator points as new starting points for new curve aim. This means that the next round of isogenies computations may be kept largely secret.

SIDH/SIKE in its unmodified form is interactive and, unless as modified as disclosed above, require exchange of intermediate public data. The literature mentions that re-use of factor ka and kb in SIDH/SIKE is advised against. However, re-use of isogeny computation results may considerably speed up keyword computation.

In accordance with an aspect of the present invention, a common secret keyword is computed using SIDH or any isogeny based DH method. The result is generally a common j-invariant or a common curve parameter. One may also carry a point, on the starting curve or being an off-curve point through isogeny steps. The common result may be used to create a common p-state inverter or inverter rule or shared secret key. Such a rule may be public or secret. If it is secret it requires to be distributed to machines. It may also be published as a public rule. For instance the rule may be: use the real part of the j-invariant and use the first k digits of the j-invariant in reverse order as a factor m and use the last k digits in reverse order as an addition factor ca. When the j-invariant is 221i+118, then the real part is 118. Using k=2 the factor m is 11 and the factor ca=81. The reversible inverter of state i is then inv(i)=11*i+118 mod-p. This is a reversible inverter. One may make the inversion more complicated by for instance interleaving or shifting as described earlier by the inventor. Clearly, the two machines Alice and Bob having computed 221i+118 now have a common reversible 431-state inverter when p=431 as in the Costello article.

In a follow-on determination of a secret common key one may provide either in clear text or in inverted or otherwise encrypted form a datapoint X which may be on the starting curve or it may not be. The same secret factors ka and kb are used in the exchange. However, the generator points do not have to be carried through in isogenies as they were already determined. One may store immediate kernels and use them for isogeny of the datapoint X. The machines may also perform the isogeny mapping computation of this point. It appears that computation of the image curve parameter is also not required, because one may apply the known Velu expression for each isogeny based on a stored/retrieved or computed kernel point to carry through the x-coordinate of the point using the related kernel point. For appropriate DH procedure both Alice and Bob machine have to publish the result of their specific isogenies of the point X. However, no other intermediate image points nor the isogeny of the curve has to be published as these are already known. Instead of publishing the image point of X by respectively Alice and Bob, the image point may be inverted or FLTed multiplicatively inverted by the secret and mutually available reversible inverter. For further processing the received point is reversed. Ultimately the isogenies are completed and a novel secret common keyword is based on the thus computed image of datapoint X.

In order to limit bandwidth requirements in exchanging public keys, SIDH/SIKE offers the opportunity to compress the size of public keys to be exchanged. This compression is described for instance in the article Costello et al. Efficient Compression of SIDH Public Keys, downloaded from 10.1007/978-3-319-56620-7_24.pdf (springer.com), which is incorporated herein by reference.

SIDH/SIKE and other cryptographic methods attempt to reduce the size of keys and make a better use of bandwidth. The SIDH/SIKE compression is based on computation of public key points as coefficients of a basis for a specific isogeny curve using two points of order $\ell$ for the public isogeny curve for $\ell=2$ or $\ell=3$ and e is eA or eB respectively, which is smaller than p. In accordance with an aspect of the present invention such or another compression is used for transmission of public key points. In case of applying such a compression method one should preferably not apply the p-state reversible inverter derived from a previous secret shared key. In such a case one should adapt the inverter or inverter rule to the pre-determined size of $\mathbb{Z}_2^{eA}$ or $\mathbb{Z}_3^{eB}$. This can be done by modifying the rule to inv(i)=11*i+18 GF($\ell$). That is: one makes terms in the inverter rule smaller than $\ell$, for instance by selecting the first k1 digits of for instance a point or a parameter or of the j-invariant that represent a number smaller than $\ell$ and for instance the last k2 digits that represent a number smaller than $\ell$. In order to make the inversion rule reversible or invertible the * and + operation should be defined over GF($\ell$) or over a prime number q so that q>$\ell$.

Re-use of the base parameters or the absence of the need to re-compute certain intermediate image points may speed up the required computations considerably. The same parameters, or at least the same private keys, may be re-used at least once and preferably more than once. There may be a risk that repeated re-use may affect security of the key exchange. In accordance with an aspect of the present invention, private parameters or keys are used a first time to determine a common shared secret key and if so desired to derive a secret reversible inverter to encipher and decipher with a corresponding reversible inverter public keys generated by using a datapoint to create a fast SIDH/SIKE isogeny secret image point and using the secret image point as a basis for a secret shared key and/or for a new reversible inverter. In accordance with an aspect of the present invention the same set of private keys are used for a limited time, for instance for a message exchange session wherein communication has to be checked or re-established. Using same private keys may be limited to for instance 15 minutes, 30 minutes, 1 hour, half a day, a day, a week or longer. One may also limit re-use to a number of times that a public key exchange takes place. For instance re-use takes place for 2, 4, 10, 25, 50 or 100 or more public key exchanges. For each re-use preferably a new datapoint not previously used, preferably a randomly generated datapoint is used. After a condition for re-use of private keys has expired, new private keys have to be used and a cryptographic cycle may start anew.

Cryptographic methods generally require full publication of all possible computational steps and only private keys are kept secret. One basically knows how a private key is used, but it is intractable to derive from public exchange of data what the private key is. The cardinality 'p' of an operation is generally part of a public key. Making an operation private by using a secret FLT tremendously boosts the security of an operation beyond the cardinality p. However, unless two machines "know" each other, they may not share a common n-state reversible inverter and then they cannot use the FLT without an exchange mechanism. In accordance with an aspect of the present invention, the issue of creating a private reversible inverter or inverter rule is addressed by generating a shared secret keyword from which a secure FLT can be derived.

In many cases, not only in SIDH/SIKE but in other public key systems, the time and effort required to generate a common secret keyword depends on the size of p or n in GF(p) or GF(n). Elements that have to be processed have more bits when p or n is greater. On the upside, this provides better security. On the downside it requires longer computations. Thus, it would be beneficial for computation time to use smaller values of n or p. The SIKE specification in Table 2.7 illustrates that SIKEp751 requires 4,541*$10^3$ cycle counts, while SIKEp434 requires about half or 1,906*$10^3$ cycles. It would be beneficial if one had an implementation with the security of SIKEp751 but with the speed of SIKEp434. This may be approached by applying an n-state reversible inverter as disclosed above. That is, a secret common keyword is computed based on SIKEp751 with eA=372 and eB=239 and n=$2^{372}3^{239}-1$ and a p-state inverter is determined from a secret common keyword for eA=216 and eB=137 with p=$2^{216}3^{137}-1$. Security of SIKEp434 is improved by encryption of public keys with a reversible p-state inverter derived from an n-state secret common keyword in SIKEp751.

A toy example illustrates this. Assume a simple SIDH system with eA=8 and eB=5 thus having prime n=$2^{eA}3^{eB}-1$=62207. Assume further for illustrative purposes that a secret common keyword sn=32771+12088i has been created, either as j-invariant or curve parameter or from an entry datapoint. We want to make the SIDH system for p=431 more secure by using at least a 431-state inverter, or by applying an FLT using such an inverter. An p-state reversible inverter rule may be created from inv(i)=a*i+b mod-p. For 'a' one selects elements such as digits from for instance the real part of sn (32771) that is smaller than p. One rule may be to take the first k1 digits of the real part of sn that form a number smaller than p=431. That would be the first 3 digits of 32771, which is 327. For b one selects the last k2 digits of sn that form a number smaller than 431. That would be the last 2 digits of 32771 or b=71. The new 431-state reversible inverter rule is then inv(i)=327*i+71 mod-431. Other rules are fully contemplated. For instance a processor may be instructed to use the odd digits of the real part for factor 'a' and the even digits of sn for the factor 'b'. Reversible interleaving of digits, shifting and the like may also be applied as well as other reversible rules. The basic rules to be applied may be public. They may also be kept private. One may create two or more reversible rules derived from a common key. For instance, a first p-state inverter is used to encrypt public keys from the Alice machine and a second p-state inverter for the Bob machine.

If unpredictable pointdata not being on a curve is used as entry data and an unpredictable p-state inverter for enciphering is used it will become very, very difficult to successfully attack SIDH/SIKE via public data. The increased security is of course not entirely free, as it may require a multiplication and an addition to encrypt and/or to determine a multiplicative inverse and in addition an inversion in decryption if one encrypts with the inverter and decrypts with the corresponding reversing inverter. In one embodiment one may pre-program instructions for encryption and decryption using placeholders for the inverter terms. Once the terms are derived from an n-state secret common keyword all required parameters to execute the inverter rules are available.

Also the cardinality p may be hidden from being a public parameter. However, this may have limited benefits for a SIDH protocol wherein only limited values of p are available if one uses p=$2^{eA}3^{eb}-1$. This requires that one selects either from pre-selected or pre-stored values of eA and eB and combinations thereof. Eventually, after several public key exchanges it will become clear around what value p is. But if one applies a limited number of exchanges this may be a way to further improve security.

A reversible inverter has a corresponding reversing inverter. From that perspective it is possible and sometimes preferable to invert public data such as public point data or a value p in accordance with an n-state inverter with n>p. For instance in the p=62207 example with secret keyword sn=32771+12088i a prime value of pk>p is created by placing concatenating the first 2 digits of sn (being 32) to p so that pk=3262207. The newly formed pk is not prime. However big-integer instructions exist to compute the next, the previous or second next or any other prime close to pk. For instance Magma has instructions NextPrime( ) that will generate pn=3262241 which is a prime number up from pk and closest to pk. One may then form a reversible inverter rule inv(i)=a*i+b mod pn using pre-agreed digits from sn to create a and b.

For example: use as 'a' the first 4 digits of the real term of sn, which is 3277 and use for b the first 4 digits of the imaginary part of sn which is 12088, provided if those terms are not 0. If 0 stick to only the non-zero element of sn. Use as pn=3272241. For instance for i=200 the result of inversion is inv(200)=3277*200+12088 mod 3272241 which is 244877. The reversing inverter rule is i=(inv(i)−b)*$a^{-1}$ mod pk. A program like Magma can rapidly determine $a^{-1}$ which is 542801. One can check that (244877−12088)*542801 mod pk will provide the original value 200.

Methods like CSIDH are presumably already non-interactive. CSIDH works in a different manner from SIDH and creates isogenies of different levels. One may modify CIDH in a manner similar as above, wherein first a secret inverter is derived and then a datapoint X is carried through. In that case one may store the intermediate kernels and use Velu formulae to carry the datapoint X through all relevant isogenies. Similar applications and modifications as explained above are possible on other isogeny based key exchanges, including with different type of curves like Weierstrasz or Edwards, or different and/or modified protocols like CSIDH as explained in articles and software provided on https://csidh.isogeny.org/ which is/are incorporated herein in its/their entirety.

For illustrative purposes and in case of SIKE, isogenies are limited to 2-isogenies and 3-isogenies. However, other p-isogenies are possible as in CSIDH and aspects of the present invention are fully contemplated as to being applied to p-isogenies with p being at least a prime number.

Other Use of Secret Reversible Inverters

One may use the above methods and/or devices to improve security of existing cryptographic primitives by applying an FLT based on secret n-state inverters and/or by generating a secret value of n being a cardinality of an operation over GF(n) or modulo-n.

In one illustrative example one may want to use a classical DH (non elliptic curve). In general one would not want to create own primes. In accordance with an aspect of the present invention a prime for a DH exchange is selected from a Diffie-Hellman group as known in the art. One may apply a coding of these groups using an n-state inverter as described above. Preferably, a relatively small prime of for instance 512 bits or 768 bits of Group 1 should be selected or created. In some cases a PQ secure secret key may be smaller than a desired length of a DH key. In that case one may extend a length of a key to obtain a desired size of an inverter to encipher a prime in a confidential prime. In general one may desire to use a relatively small generator element. However a private and secret generator may be beneficial. In that case one should avoid relatively small and commonly used generators as they will leak information about the inverter. One may also use key stretching or key derivation functions or a salt to extend the PQ secure keyword to a practical DH usable inverter.

In a similar way one may apply a PQ secure common keyword to make a RSA method using relatively small parameters secure and comparable to for instance p=4096 RSA keywords. DH is a closed system. Thus a complete FLT of operations may be replaced by inverting with the secret inverter of public keys and final secret key. The number of potential inverters is so large that without sufficient information it may not be possible to successfully recover a common secret keyword from publicly available data. RSA is an encryption method that may use at least one secret message m. This offers the opportunity to apply at least one FLT to further secure a common keyword.

In one embodiment of the present invention both Alice and Bob machines derive a secret reversible n-state inverter or inverter rule from a PQ secure key exchange method. If needed a key extension is applied to achieve an inverter of for instance 1024 bits. The machines follow the steps of RSA using parameter sizes related to the inverter but preferably smaller. For instance Alice creates a composite integer represented signal n formed from two primes p and q so that n=p*q has a length of 512 bits or smaller. The public keys n and e are enciphered based on the inverter and transmitted to the Bob machine that performs a message cipher $(m)^e$ mod n wherein $m^e$=m⊛m⊛ ... ⊛m or (e−1) consecutive performing of operation ⊛ which is the FLT of * mod n in accordance with the secret inverter. By keeping at least n and potentially e secret (and selecting for e a not commonly used value) one may greatly increase security of small length RSA keywords. This comes at a cost of an upfront PQ secure operation that allows a secure RSA that is faster than classical secure RSA which now may require keywords of 4096 bits.

In a similar way one may modify Diffie Hellman Elliptic Curve key exchange using secret n-state inverters by using smaller pk cardinality of operations as significant public keys and/or parameters are kept secret by for instance by enciphering based on a secret inverter or a secret FLT.

It is noted in the literature that public keys are large in SIDH (and smaller in CSIDH). Still, measured against available sizes of memories and even caches, the total need for memory of all intermediate data to compute a final output, such as an isogeny parameter or j-invariant is not exorbitant. Measured against computational requirements, making memory available may be more advantageous than re-computing curve or isogeny parameters. In published isogeny protocols such as SIDH/SIKE and CSIDH the desired result is a j-invariant or a curve parameter (usually A in $y^2=x^3+Ax^2+x$). A computationally expensive operation is determination of a kernel point of an isogeny and the related mapping of curve points.

In accordance with an aspect of the present invention a point (x,y) which may be on an initial curve or may preferably not be on the initial curve, is carried through all isogenies to determine a result point which may not be on the result curve. In order to compute the isogenies, for each isogeny a kernel point may be needed. The kernel points are originally computed from base points that are carried through the isogenies. Rather than re-compute these kernel points they may be stored in memory and retrieved into proper processor memory or cache to be used for computing the image point related to a starting point based on a relevant kernel. For instance in SIKE434 one uses e2=216. The protocol at the Alice side ℓ=2) computes 2*216=432 isogenies which each requires a kernel point. Assuming a 600 byte size kernel or even a 1 kB kernel point, less than 500 kB memory is required to store all kernel points. This may speed up considerably generating the public part of a computed point and the generation of a shared secret end-point. A secret common reversible n-state inverter may be derived from an original or starting SIDH or CSIDH protocol. Such a secret inverter may be used to invert the point that is to be carried through the isogenies and/or the public point that is exchanged between two machines.

The determination of a secret n-state inverter in CSIDH may be illustrated using a toy example of CSIDH over F419 in the slides Castryck et al. CSIDH: An Efficient Post-Quantum Commutative Group Action down loaded from https://yx7.cc/docs/csidh/csidh_cwg_slides.pdf which is incorporated herein by reference. Slide 25 of 79 illustrates the different curves $E_A$: $y^2=x^3+Ax^2+x$ over F419 due to 3-,5- and 7-isogenies with expressions for a 3-isogeny from curve $E_{51}$ onto curve $E_9$. Herein p=4*3*5*7−1 with 26 different curves that can be reached from a starting curve (27 curves in total). The CSIDH example shows a secret isogeny starting from $E_0$ or $E_0$: $y^2=x^3+x$ with as shared secret curve $E_{390}$ or $E_{390}$: $y^2=x^3+390x^2+x$. As an illustrative example, one may use the first 2 digits of the curve parameter (being 39) as a multiplication factor and the last 2 digits (being 90) as an addition factor mod-419 to create a reversible 419-state inverter inv(i)=39*i+90. Another example may be inverter inv(i)=390*i+093 or inv(i)=2*390*i+3*093 mod-419 or any shared rule between Alice and Bob machines to determine a shared reversible n-state inverter. If needed, one can generate a p-state inverter by doing the above computation mod-p with p<n. One may also create inverters with p>n by applying additional agreed upon multiplication factors k1 and k2 so that inv(i)=k1*a+k2*b mod-p.

In accordance with an aspect of the present invention, such inverter may be used in a different cryptographic application that is modified in accordance with a common or shared reversible inverter or in CSIDH method with an n2 that is smaller than n1. For instance, a first CSIDH method is used with n1=$4^{i3}*5^{i5}*7^{i7}$−1 and n2=$4*3^{k3}*5^{k5}*7^{k7}$−1 and n2<n1. For data exchange the computed n1-state inverter is applied. Thus providing faster computation of smaller isogenies enhanced by security of using a difficult to determine n-1-state inverter.

Furthermore, one may apply a (x,y) coordinate that may represent a point on the original curve and encode or encipher the (x,y) coordinate with the previously determined inverter. The point (x,y) may also be NOT on the original curve. The exchange data is also enciphered on the basis of the reversible inverter. Practically, the literature recommends p being a composite of about 74 primes with powers in [−5, 5]. If so desired, the computed parameters of the intermediate isogenies may be stored and re-used to carry the point (x,y) through all the isogenies. A shared secret after re-use of the original CSIDH method is at least the x-coordinate of the final point generated by both the Alice and Bob machine. In one embodiment of the present invention the point (x,y) is on the original curve. The shared secret is based on at least the x-coordinate of the computed end-point at the Alice and Bob machine. An agreement may be made between the two machines to arrive at a common and shared y-coordinate that is used to further determine a common shared secret. In one embodiment of the present invention, the starting point is not of an order of the used primes or prime$^{factor}$. One may generate at random a point that is not on the original curve. The shared secret is then again based at least on the x-coordinate of the carried through point generated by the end curve. It is again noted that even though curve expressions are used or expression related to a curve, the computed point itself does not need to be on the curve. As in SIDH, the above approach allows a re-use of previously determined parameters and at least prevents exchange of public keys as these remain the same. Only the intermediate coordinates have to be exchanged. These intermediate coordinates or public coordinates may be exchanged "in the clear" or may be enciphered based on the earlier determined reversible inverter.

In general isogeny computation may be easier for a server than managing a set of kernel points. In one embodiment of the present invention, one machine may recompute kernel points while another machine stores computed kernels and/or curve parameters and retrieves stored kernel points and/or computed curve parameters for isogeny computations of a new point. This retrieval of stored isogeny data takes place until initial parameters (especially multiplication factors) are changed and a new cycle is started.

In one embodiment if for instance a curve is defined over $F_{p2}$ one may agree that the y-coordinate of a point is determined to be based on its lowest real value equivalent, in order to arrive at the same (x,y) point at two machines.

Once a secret common key that is PQ and classical secure has been computed, a secret n-state inverter may be derived that is also PQ secure. Security may be increased by applying cryptographic primitives that do not require any or very limited exchange of data between machines. One can come up with many variants of such procedures. One may mix different primitives. For instance, determine a common keyword via SIDH/SIKE and then proceed with common secret mod-p multiplication. It is noted that for instance a point multiplication k*P over an elliptic curve, when not degenerative, even when P is not on a curve will generate the same result, when both machine perform the same computations. As an illustrative example, a secret common curve parameter Ab which may include several sub parameters is computed by two machines. The curve determined by Ab is then applied to determine k*P. The factor k may be derived from Ab as shown above or from a derived parameter, such as the j-invariant of Ab. A point P may be randomly generated and transmitted by one machine. It may be inverted by both machines based on a common secret inverter into P' and then computed as k*P' by two machines to arrive at a common new shared and secret keyword Q. New computational parameters may be derived from the newly computed point or from a combination of previously computed and newly computed data. As long as no interactive data is exchanged (except random data), no data is available for serious attacks by an attacker.

Elgamal encryption is a known primitive to encrypt a message. It is often used as an alternative to RSA. Elgamal also has a signature scheme. Elgamal encryption may also be used in an elliptic curve. Instead of powers of a generator term as in the original Elgamal system, the elliptic curve form applies multiplication of points as known is elliptic curve cryptography (ECC).

Elgamal, like RSA and unlike Diffie-Hellman (DH) is not a closed system because a user defined message m is applied. In FLTed DH one works with an inverted generator term. In RSA and Elgamal one may apply any viable message, though preferably not one that represents an inverter zero-element or one-element. Elgamal, in principle and as known to one of ordinary skill uses preferably a finite field Fq and selects a generator element g, and a machine generates a term h=$g^x$ in Fq with x being private and transmits h to the Bob machine. The Bob machine generates s=$h^y$ with y preferably random and c1=$g^y$ and c2=m*s and transfers [c1 c2] to the Alice machine. Because m is secret and not predetermined, an FLT will increase the security of Elgamal encryption.

As an example take q=23 and F23 with generator 5. With x=7 and y=14 and m=21, [h c1 c2]=[17 13 6]. Using an FLT with reversible 23-state inverter inv=[22 2 5 1 6 7 12 9 16 20 3 8 18 4 11 10 17 14 13 0 19 15 21] will require a generator gf=rinv(g)=rinv(5)=2, which may be determined by the Alice and Bob machines based on the inverter. In the Elgamal exchange using x=7 and y=14 and message m=17 will have data transfer [h c1 c2]=[16 18 9].

In the elliptic curve Elgamal, a generator point P is "multiplied" by secret a to form A=a*P and transmitted by the Alice machine to the Bob machine. The Bob machine computes K=k*P and C=k*A+m wherein message m is preferably a point on the curve, though that may not be required in all circumstances. The Bob machine transmits encrypted message C=k*A+m and K to the Alice machine. The Alice machine computes S=a*K=a*k*P. k*A=S and thus C=S+m and thus m=C−S. Suppose an FLTed curve is determined by $y^2=x^3+a*x+b$ or in FLTed form $y^2=x^3 \oplus a \circledast x \oplus b$. One may then select an m with a random x-coordinate on the FLTed curve and determine the corresponding FLTed y-coordinate. This breaks the relationship between classic and FLTed elliptic curve Elgamal.

In accordance with an aspect of the present invention one or more signals represent a message or one or more symbols which are modified in accordance with an n-state reversible inverter and/or inverter rule or with a part of an n-state inverter or inverter rule preferably with n>3 or more preferably n>100 or more preferable n>250. As explained herein a first modification in accordance with or based on an n-state inverter may be an n-state Finite Lab-transform or FLT. That is, a cryptographic method, primitive or circuit is determined by an n-state switching operation. Such an operation may be defined as a binary operation and operates on sets or words of at least k-bits with k>1. In that case it is understood herein that in that case the n-state operation may be described by an n-state operation, which in the binary case in $n=2^k$.

The FLT of an n-state operation preserves meta-properties of an n-state operations but may change a state which represents a zero-element or one-element of the operation. It has been disclosed by the inventor thereof that one may thus modify by FLT known cryptographic methods and/or circuits for instance DES, 3DES, AES, SHA-1, SHA-2 and SHA-3 and other methods of encryption/decryption and hashing or message digest generation. In accordance with an aspect of the present invention one may also modify an input signal and/or an intermediate signal and/or output signal in accordance with a reversible n-state inverter. Such an inverter may be the same inverter of the FLT or a different one. One may use the n-state inverter to modify a signal. Or one may use the corresponding reversing n-state inverter to modify a signal. A requirement to obtain useful results is that two machines using the methods of this disclosure is that all use the same modifications (in case of hashing for instance) or corresponding reversing modifications in case of encryption/decryption.

In some cases, cryptographic procedures may be closed, in the sense of having pre-defined parameters. For instance in a standard Diffie-Hellman (DH) method to determine a common keyword $g^a*g^b=g^{ab}$ two machines use the same operation * defined over GF(n), and a predefined generator g. The intractable part comes from both machines selecting sufficiently large terms a and b. The machines exchange $g^a$ and $g^b$ in order to arrive at a common $g^{ab}$. One may apply an FLT on the operation. For both machines to perform a correct FLT modified DH, they have to use the pre-defined generator g. If an FLTed operation $\circledast$ (the FLT of *) is used, the FLTed $\circledast$ should be applied to a generator gf=rinv(g). A potential weakness may be that the intermediate results ($gf^a$ and $gf^b$) that are exchanged are in fact $rinv(g^a)$ and $rinv(g^b)$. In accordance with an aspect with an aspect of the present invention, one may reversibly encipher input and/or intermediate and/or output data with one or more times application of an n-state inverter. For instance in the FLTed DH method one may apply the reversing inverter rinv k times. Thus $gf^ak=rinv^k(rinv(g^a))$. For correct further processing, a receiving machine then applies the n-state inverter inv k times and $gf^a=inv^k(rinv^k(rinv(g^a)))=inv^k(rinv^k(gf^a))$.

This is easily illustrated with an example over GF(19). Assume a reversible 23-state inverter is inv=[22 2 5 1 6 7 12 9 16 20 3 8 18 4 11 10 17 14 13 0 19 15 21]. A corresponding reversing 23-state inverter is rinv=[19 3 1 10 13 2 4 5 11 7 15 14 6 18 17 21 8 16 12 20 9 22 0]. One may check that inv(rinv(3))=3 (origin−0). One can also check that $rinv^4(6)=12$ and $inv^4(12)=6$. For relatively small values of n an inverter rule inv(i)=a*i+b mod-n may not be secure enough. Additional transposition increases the security.

Accordingly, part of a modification may include at least once or up to k application of an inversion, an inversion rule, a reversing inversion or reversing inversion rule that is preferably kept secret and is common to two machines that are engaged with a modified cryptographic method. For instance, in an illustrative example of a modified DH method an intermediate result is a 23-state state 6. This result is modified consecutively 4 times with the above 23-state reversing inverter rinv to transmitted message 12. The receiving machines applies the 23-state inverter inv 4 times to recover state 6 and applies this state in completion of a DH or modified DH computation. The two machines may be programmed to apply addition inversion of the DH result to generate a common keyword.

This approach may also be applied to Elliptic Curve DH. It may also be applied to other forms of DH computations such as Isogeny Based DH or any form of cryptographic computation wherein an exchange of data takes place between at least two machines.

In accordance with an aspect of the present invention, data that is exchanged as part of a cryptographic method between two machines may be modified in accordance with an FLT. For instance, a machine transmits an intermediate result of a DH or modified DH procedure to another machine. Assume such a data is represented as ge. Rather than transmitting gh, the transmitting machine determines $gh^{-1}$ based on an inverter based FLT, wherein $gh \circledast gh^{-1}=f0$. Thus $gh^{-1}$ is the multiplicative reverse relative to $\circledast$ and wherein f0 is the one-element of the FLTed operation of * into $\circledast$. When the inverter of the FLT is secret than certainly the inverse of gh relative to the FLT is secret and intractable to determine. One can check that $gh^{-1}=rinv(g^{-1})$ wherein rinv(g)=gh.

One may apply the same approach in Elliptic Curve Diffie Hellman (ECDH) by determining for data exchange the multiplicative inverse coordinates of public key (xp,yp) relative to operation $\circledast$.

One may apply the same approach in for instance Isogeny Based DH like SIDH and CSIDH. The public keys are then modified by the above approach. Because isogeny based methods apply computations based on Gaussian integers in field Fp the computation may look a bit different, but is essentially the same as above. Assume a public key has a coordinate cor1=a+b*i wherein one may call a the real and b the imaginary part and $i^2+1=0$. The multiplicative inverse of a+b*i is c+d*1 and (a+b*i)*(c+d*i)=1+0*i wherein (1+0*i) is the neutral element. For a multiplicative inverse it requires that $c+d*i=(a-b*i)/(a^2+b^2)$. Or $(c+d*i)=(a-b*i)*$ $(a^2+b^2)^{-1})$. One is reminded that the above applies to the FLTed operation and thus one has to compute $(c \oplus di) \circledast (a^2 \oplus b^2)^{-1}$. The inverse of $(a^2 \oplus b^2)$ is relative to the neutral element of the FLTed operation $\circledast$ which is preferably not 1, but for instance f0.

The above may be implemented in a computer program that is easy to execute to compute the desired result. However, it is hard to determine (a+b*i) from (c+d*i) when the related inverter of the FLT is kept secret.

A combination of intractable problems like EC, RSA, DH, SIDH, CSIDH with hard to find reversible inverters from public keys increases security of inverter based modifications of cryptographic methods. Assume solving an intractable problem requires an effort z=f(k, . . . ) which is an effort depending on at least a parameter k. Commonly k relates to the size of a finite field GF(k). Unless there is a deterministic way to determine inverters from published data, which is believed to be very hard, the solving of this problem requires an effort h=g(k, . . . ). This suggests that one can achieve a same level of security by lowering z1=f(k1, . . . ) to z2=f(k2, . . . ) with k2<k1 if one applies h2=g(k2, . . . ). For k=k1 or unmodified method h=1. Applying an FLT or other inverter based modification requires increased efforts, but presumable much less than savings from fewer operations in the original intractable problem. For instance lowering a size of a field with 25% may reduce computation efforts from $f(x^{k1})$ to $f(x^{k2})$ while the required increase of effort is linear f(k1-k2). This may lead to a substantial increase of security at a same or similar level of computation effort or achieve an acceptable level of security at a relatively low level of computation efforts. This is beneficial in low computation resource machines as found for instance in Internet of Things (IoT).

An illustrative example is the use of elliptic curve pairing based cryptography. For instance, pairing based signatures or validation that may pertain to a confidential group of machines, benefits significantly of the FLT. It is known that elliptic curve based pairing may offer significant security benefits. For instance the article Boneh et al. Short Signatures from the Weil pairing, downloaded from https://www.iacr.org/archive/asiacrypt2001/22480516.pdf which is incorporated herein by reference teaches the creation of very short but highly secure cryptographic signatures or machine signatures. These signatures based on Weil pairings of points of an elliptic curve may be called BLS signatures. Briefly recapped, in a BLS signature a signing machine determines a Weil pairing of 2 points on a curve (or on different elliptic curves) but with identical order. A first point P is a public generator point that is "multiplied" as known in the art by a private or secret number k. A message m is hashed to H(m) that represents an x-coordinate of the (or one of the) starting curves and the corresponding y-coordinate is determined. A public point Pk=k*P is generated with k held secret. The signing machine then determines signature point S which is k*H(m). The signature is also public. A receiving machine determines the hash H(m) and pairings e1(P,H(m)) and e2(Pk, S). If e1=e2 the message signature is validated.

Unfortunately, pairings determinations are quite resource demanding. One may achieve the benefits of BLS signatures with may be as small as 33 bytes by limiting the size of the finite field for computations and by enciphering the public data S and/or Pk with a reversible n-state inverter. A receiving machine recovers clear S and/or Pk by applying a corresponding reversing inverter.

Applying in a cryptographic method of a reversible n-state inverter may be susceptible to brute force trial of all possibilities. In accordance with an aspect of the present invention, an attack should require a certain level of effort. This will render a successful attack, especially a brute force attack, less likely because a significant amount of processing effort is required. One way to increase a level of attack effort is to encode or encipher public data or at least part of public data with an FLT. For instance if public exchange data is 'dat' as defined under GF(n) or modulo-n requirements, an n-state reversible inverter may be used to encipher 'dat' to inv(dat) or rinv(dat), which is deciphered at a receiving machine. In accordance with a further aspect of the present invention a machine determine $datFLT^{-1}$, which is an inverse of 'dat' relative to an FLTed operation such as $\circledast$ which is the FLT of a multiplication operation or $\oplus$ which is the FLT of a '+' or addition operation.

In accordance with an aspect of the present invention $dat_{FLT}^{-1}$ is the inverse of 'dat' determined from the FLT. Assume an n-state inverter inv. For instance an n-state operation * is FLTed from inv and corresponding reversing inverter rinv into $\circledast$. The new one-element under which the inverse $dat_{FLT}^{-1}$ is determined is rinv(one)=onef wherein 'one' is the original one-element. One determines then $dat_{FLT}^{-1}$ so that $dat \circledast dat_{FLT}^{-1}$=onef. How to determine FLTed inverses in different manners has been explained previously by the inventor. For example use n=23 and GF(23) and as 23-state reversible inverter the 23-state identity inverter ([0 1 2 3 . . . 21 22]) which is cyclically shifted 3 positions to the left ([3 4 5 . . . 21 22 0 1 2]) and has as reversing inverter rinv=[20 21 22 0 1 2 . . . 18 19]. From rinv one can see that the new one element onef=21. Take element g=15. The multiplicative inverse $g^{-1}$ in GF(23) is 20 as 20*15 mod-23=1. The FLT of * in GF(23) is 0. The multiplicative inverse of g=15 in 0 relative to onef is $g_{FLT}^{-1}$=6 as 15$\circledast$6=21. A receiving machine can recover g=15 from 21 by determining the FLTed multiplicative inverse of 21 relative to onef. One may of course also determine an inverse relative to another operation, like addition.

In accordance with another aspect of the present invention, a data element may be inverted with an n-state inverter before an inverse is determined. For instance with g=15, inv(15)=18 and rinv(15)=12. The inverse of 18 over *GF (23) is 9. This is different from the original inverse, which is 20. One may also determine the multiplicative inverse of rinv(15)=12, which is 21. One may also determine the FLTed multiplicative inverse of 18 which is 8 (8 $\circledast$ 18=onef=21.) One may also determine the FLTed multiplicative inverse of 12 which is 17 (12$\circledast$17=onef=21).

It is common to define additive and multiplicative inverses relative to 0 and 1, respectively. However, one may also redefine and inverse such as a multiplicative relative to an element not 1. For instance, one may define a multiplicative inverse over GF(23) relative to 3. The new inverse of 7 relative to 3 is then 7, as 7*7 mod-23=3. Such inverses are easy to determine, especially in modular computations, but form an additional burden on an attacker.

A reversible n-state inverter herein, is a reversible inverter represented as a series of n elements, each element having one of n states, each element having an index and each of n-states appears exactly once. A reversible n-state inverter, represented as inv has n elements in n positions. One may represent an n-state inverter as an integer function inv(i)=k. Herein, unless specifically indicated otherwise, the use of a reversible n-state inverter means an inverter that is not identity. The identity inverter may be represented as inv(i)=i. Such an inverter leaves all elements (or signals in a circuit that is represented by an inverter) unmodified and, again unless specifically mentioned as such, is not intended to be used in the herein provided aspects of the present invention, unless indicated as such specifically.

The above approach also applies to elements in a finite field of Gaussian integers. For instance the finite field $GF_{p2}$ has elements a+i*b and $i^2+1=0$ and a and b in GF(23). An element a+bi has as multiplicative inverse 1/a+bi or after some manipulations $(a-bi)*(a^2+b^2)^{-1}$.

One can check that element (3+5i) with a,b in GF(23) has as multiplicative inverse (17+10i) with (5+3i)*(17+10i)=1. The FLT applies to these inverses. Accordingly, in for instance a SIDH isogeny computation two machines exchange public data. These data may be modified as to be represented as for instance an FLTed multiplicative inverse or any other secret modification. The machines are enabled to restore the modified data to a form that is applied to further computation of a common keyword.

Gaussian integer representation of n-state operations is provided in the context of isogeny based cryptography. However, Gaussian integer representation may be used in many different cryptographic operations such as key exchange, encryption, and signature generation. A further range of Gaussian integer based cryptographic methods that are modified using an FLT is disclosed and described in US Provisional Patent Application 63/067,281 from which the instant disclosure depends.

In general a cryptographic machine and/or method applies one or more common public parameters, like n of GF(n) and g as generator in classical Diffie Hellman key exchange. By providing unusual data as public parameters, an attacker may be alerted that a modification, such as an FLT is applied. This may provide a give-away to an attacker to exclude certain data in an attack. It would be beneficial to hide the fact that an FLT and/or an n-state reversible inverter is applied. In that case one prefers to apply an FLT or an n-state inverter that leaves data that are part of a public key unmodified.

For instance, using GF(23) the element g=5 is a generator element. The example 23-state inverter is inv=[3 4 5 6 7 8 9 10 11 12 13 14 15 16 17 18 19 20 21 22 23 0 1 2]. It is preferred that invr(5)=5. However (using origin 0) currently inv(5)=8. Furthermore inv(2)=5. In order to make the inverter invr with invr(5)=5, element of invr(2) should be given the content of inv(5)=8 so that invr(2)=8, which will give the inverter invr=[3 4 8 6 7 5 9 10 11 12 13 14 15 16 17 18 19 20 21 22 23 0 1 2]. One then generates the FLT of *-mod-23 in accordance with inverter invr. This ensures that gf=5 is now a generator of the exponentiation of FLTed * which we may call ⊛.

The effect of the FLT using this modified and adjusted inverter (that is: adjusted for not modifying one or more public data) is that $g^k=g*g*g \ldots *g$ mod-n is likely different from $gf^k=gf⊛gf⊛ \ldots ⊛gf$, while gf=g and ⊛ is the n-state FLTed version of *, with the understanding that inv(g)=g and inv being a reversible n-state inverter. In the above example $g^4=4$ and $gf^4$ under ⊛ generates $gf^4=1$. So, while for an uninformed attacker, the operation looks like a common DH operation, the actual operation is modified generating an unexpected result. Common attacks on DH will be ineffective. It is further noted that using the not adjusted n-state inverter will generate an FLTed operation that does NOT have g=5 as generator.

As a further example, the above FLT is applied to * mod-233, The element g=87 is a generator of GF(233). Using inv(i)=199*i+98 with the * operation will create an FLTed operation ⊛1 which does not have g=87 as a generator. The inverter is adjusted for g=87 by making invr=inv and modifying invr(87)=87. The inverter element inv(87)=171 and inv(158)=88. These elements are modified in invr so that invr(158)=171 and invr(87)=87. Based on the new inverter a new FLTed operation is generated as ⊛2=labtransform(*, invr). One may check that g=87 is a generator of ⊛2. One may also check that g*g=113 and gf ⊛ gf=75 with gf=g. This proves that, the FLTed operation using the same generator element as the original operation will generate different results. This is of course beneficial for increasing or improving a security of a cryptographic operation such as DH key exchange.

The above adjustment of an inverter or FLT to ensure that a public key remains unchanged under an FLT, may be applied to any cryptographic method that applies a generator element or a public key which may be limited by verifiable conditions. Thus, a change or modifications of such a generator element or starting element or public key under an FLT may be an indication to an attacker that a modification is applied. Even when it is clear that a modification or FLT is applied, a successful attack on an FLTed cryptographic method is generally unsuccessful. One reason is that on top of a generally intractable problem, there are just too many possible FLT configurations. However, in order not to alert an attacker of a possible FLT or modification, it may be beneficial to apply an FLT or encryption that leaves the initial public key unmodified. Any follow-up public key exchange as in classic DH and other methods, including Elgamal, which also applies a generator element, will appear as a valid public-key. However, such a public key will not help an attacker as it appears to be generated with common GF(n) operations. An attacker may even derive correct exponents for these public keys under unmodified DH. However, these derived exponents will not lead to the correct common keyword under the provided FLT modifications.

The above adjustment of the FLT or n-state inverter requires a different approach when a machine applies a computational inversion rule, rather than a stored switching table or stored inverter. Rather than performing the inversions of FIG. 1 and the reverse inversion of the result, an exponentiation $gf^k=gf⊛gf \ldots ⊛gf$ k−1 times may be performed by $gf^k=g*g* \ldots *g$ mod-n k−1 times (gf=g) and performing the reversing inverter of invr (which rinvr) on the result with a reversing inverter rule, wherein one has to catch a modified result, due to the modification of the inversion rule for invr(g)=g. The reversing inversion rule exchanges the output for input states g and for the inverter index 'ind' for which inv(ind)=g. Thus rinvr(g)=g and rinvr(inv(g))=ind. Thus one has to catch these input states prior to reversing inversion and apply the correct inversion.

One benefit of the above approach is that one may modify an n-state inverter for an FLT ad hoc on the basis of one or more public keys, which may be variable. For instance, there are usually multiple generator elements of a finite field.

One may apply a similar approach to elliptic curve based methods. One may apply an n-state reversible inverter, for instance to FLT modify the to be applied computer operations. One may use one of one or more n-state reversible inverters available to two machines that apply matching cryptographic methods on a message that is exchanged. However, public keys in elliptic curves have generally more components than classical methods.

An elliptic curve expression may be determined (in Weierstrasz notation) as $y^2=x^3+ax+b$, requiring two parameters a and b. Furthermore, a point on an elliptic curve is determined two coordinates, even though the second (or y coordinate) may be derived via the curve expression from the x-coordinate. Furthermore, the number of points on a curve over a finite field is limited. Certain x-coordinates do not occur in curve points. The application of FLT and inverter based modifications generate curve points that generally are not on an original curve. The FLT in general modifies the curve expressions. An attacker thus may conclude from a public key exchange (such as k1*G and k2*G in ECDH) that these do not represent points on an original curve. It will be impossible for an attacker to derive an applied n-state inverter from public data alone, unless in some way one or more of the private keys were revealed. One may still modify a reversible n-state inverter to keep one or more public parameters unmodified. However, intermediate key exchange may reveal that these points are not on a published curve.

In a further embodiment of the present invention, one may encipher elements of an intermediate key exchange as inverses relative to an FLT as disclosed earlier above. One may also publish all initial and intermediate public keys in unmodified form, but compute or modify the common keyword in accordance with a common n-state inverter or FLT derived from that. An attacker is unable to discern from public key exchange that an FLT or n-state inverter will be applied, let alone what the modification is or will be.

Matrix Based Diffie Hellman Key Exchange

In accordance with an aspect of the present invention, an apparatus and a method are provided to generate a common keyword at two computing machines, using at least a common key and private keys and using matrix based computations. Using matrices in cryptography as opposed to single elements in a finite field or ring adds complexity to computations. Though it may increase computational efforts of the machines it also requires increased efforts from an attacker to successfully attack a cryptographic method. The efforts of an attacker on matrix based cryptography is greater than a burden placed on authorized machines. There are several ways to design a matrix based key exchange system.

In a first embodiment one may apply an k-by-k n-state matrix, say A, which may be a common and public element of the system. In a further embodiment an Alice machine applies secret/private key ka to compute $A^{ka}$ and publishes $A^{ka}$ to the Bob machine. The Bob machine applies private key kb to compute and publish public key $A^{kb}$. The Alice machine computes $(A^{kb})^{ka}$ and the Bob machine computes $(A^{ka})^{kb}$. The common and secret key may then be $A^{ka*kb}$. This requires that A has associative properties. It is well known that matrix multiplication is not automatically commutative. However: $A^p*A^k=A^k*A^p=A^{p+k}$. Furthermore, while not strictly required, one would like the matrix A to be a generator element of the group of matrix products preferably in a cyclic way, and preferably so that the repetition rate of the multiplication of n-state multiplication is as close as possible to n.

Different ways to create matrix based key exchange systems and/or DH-like matrix based key exchange systems have been proposed. For efficiency reasons these systems are often limited to binary and/or 2-by-2 matrices and/or include multiple matrices, due to the limitations of lack of commutative operations.

Figure 6:
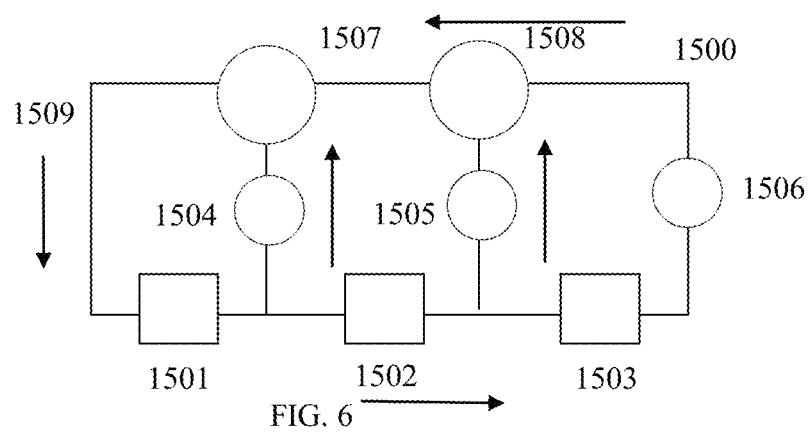
FIG. 6 illustrates a sequence generator in accordance with an aspect of the present invention.

One way to determine an n-state matrix that fits a need of a cryptographic operation is a matrix that represents a feedback shift register (FSR) operation, of which the LFSR (linear feedback shift register) is a known device. Such a device 1500 in Fibonacci configurations is illustrated in generic form in FIG. 6. FSR 1500 has 3 shift register elements 1501, 1502 and 1503 and n-state inverters 1504, 1505 and 1506 and 2-input/one output switching devices 1507 and 1508. Loop 1509 is a straight through connection and may be represented by an identity inverter, as what goes in comes out. The arrows are to indicate a direction of signal flow in 1500. A device as shown in FIG. 6 can be represented by a polynomial of order 3. For instance by $1*x^3+b*x^2+c*x+d$ wherein * and + are n-state operations, yet to be defined and b, c and d are based on n-state inverters not representing a zero-element. An open connection may be considered an always off inverter and loop connection 1509 may be represented by the identity inverter. The FSR operates under a clock signal, not shown but assumed as not to confuse the diagram by too many details, so that a content of a shift register element is used to determine a new signal after which all signals are shifted in a counter clockwise direction. A content of a shift register (in this example 3 elements) is cyclic, in the sense that an n-state FSR such as 1500 has at most $3^n-1$ unique contents. When an initial content re-appears after $3^n-1$ cycles, 1500 is called a maximum-length (ML) sequence generator. This generator is then represented by a primitive 3-degree polynomial over GF(n). As an illustrative example, one may use a n=11 system, which means the signals and the operations on the signals are represented by 11-state operations such as addition and multiplication operations defined over GF(11) with zero-element represented as 0 and one-element represented by 1. The switching functions 1508 and 1509 may be represented by addition mod-n (or mod-11 in the example) and the inverters are multiplication mod-11 with a constant factor. For instance the multiplication *5-mod 11 is the 11-state inverter [0 5 10 4 9 3 8 2 7 1 6].

Figure 7:
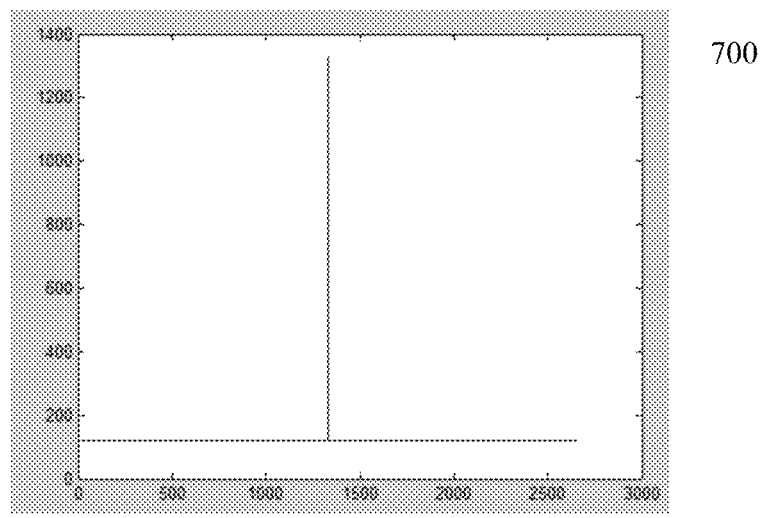
FIGS. 7 is a screenshot of a correlation graph generated from a maximum length signal sequence generated by a sequence generator in accordance with an aspect of the present invention.

FSR device 1500 is a 11-state ML generator of a sequence of length of 1330 elements when is shows a particular autocorrelation graph such as in graph 700 in FIG. 7 or when the content of 1501, 1502 and 1503 [x1 x2 x3] has 1330 (is $11^3-1$) different consecutive contents. Being an ML generator means that 1330 different combinations of [x1 x2 x3] occur. The only combination that does not occur is [0 0 0] which is a forbidden and degenerative condition. Each of the valid [x1 x2 x3] contents is a valid starting position or generator state. Using still GF(11) as representing the operations of 1500, then 1507 and 1508 are represented by addition over GF(11) (which is +-mod 11) and 1504 is represented by a 11-state inverter represented by 0*11 mod 11 and 1505 by *9 mod 11 and 1506 by *7 mod 11.

It has been explained by the inventor elsewhere how to generate ML n-state sequences and how to check if a generator is indeed ML. One way is to have a k-element n-state FSR generate a complete sequence of $t=n^k-1$ elements. Then form a sequence by concatenating the sequence t with part of itself into a sequence of 3t-2 elements and compare (correlate) the sequence of t elements step by step with a sequence of t elements in the 3t-2. An ML sequence will generate a correlation that is flat with one central peak. One example of such a correlation graph is illustrated in computer screen capture 700 in FIG. 7 of a graph generated by a Matlab program. The first inverter in this specific representation is always a connection 1509 in FIG. 6 which would be identity or being 2 in origin−1.

The 11-state generator 1500 may be represented by a primitive polynomial of degree 3 as $x^3+c1*x^2+c2*x+c3$ over GF(11) which is represented in origin 0 with its illustrative coefficients as [1 0 2 4] in its coefficients origin−0 and [2 1 3 5] in origin 1 and the first coefficient may be considered to be always 1 (or 2 in origin−1) and thus may be left out of the representation. The illustrative example generates a 11-state maximum length sequence of $11^3-1=1330$ elements. Hence the correlation graph 700 having indicia on the x-axis of up to 2600, as a correlation graph of a sequence requires about twice the length of that sequence. An important property of the graph is the single peak and flat basis over about twice the length of the sequence, which indicates a maximum length sequence.

Another important property of a maximum length sequence is that the combined content of the shift register elements is unique for each state of generating the sequence. That is, during 1330 steps of generating the sequence content [a b c] of 1501, 1502 and 1503 does not repeat and ranges between [1 1 2] and [11 11 11] (in origin−1). In the current configuration [1 1 1] is excluded as being a forbidden (and degenerative) FSR state. This makes a current state of an n-state FSR with n being fairly large, a simple keyword generator. All states are deterministic. This also makes an FSR with a long cycle a good candidate for a Diffie Hellman (DH) key generating system. ML FSRs may be described as performing in accordance with an additive group. That is, an Alice machine may generate starting a FSR from content START in k1 steps a content PUBA which is published for use by a Bob machine. The Bob machine may run the FSR from START in k2 steps, generating PUBB as published content. The Alice machine using PUBB as initial point and running k1 steps and the Bob machine running the FSR for k2 steps from initial shift register content PUBA will both end at a same content KEY, because running an FSR (k1+k2) steps is identical to running it (k2+k1) steps.

To become practical, an FSR DH method requires at least two conditions: 1) the number of FSR steps must be large enough to make it intractable for an attacker to determine steps k1 and k2 from the public keys; and 2) both the Alice and Bob machine must be able to determine the public and shared keys fast enough. One advantage of a FSR DH method is that any valid, non-degenerative state can be used as a starting state and no specific generator element has to be determined.

One may use a matrix representation of an FSR to compute an end-state and it is not necessary to run through all individual states which would be unpractical. This method is partially illustrated in the Wikipedia article Linear-feedback shift register, downloaded from https://en.wikipedia.org/wiki/Linear-feedback shift register which is incorporated herein by reference. The article discloses the matrix form for determining a k-step state from an initial state using a transfer matrix which may represent a Galois or a Fibonacci configuration LFSR. It is observed by the inventor that it is not required for the FSR to be linear. For illustrative purposes the Fibonacci configuration is used herein. It should be clear that one may also apply the method as taught herein for Galois configuration FSRs.

A single FSR step in the FSR from state k−1 to state k is achieved by multiplication of initial state with the FSR matrix. The FSR Matrix is an n by n matrix, wherein n represents the number of taps or coefficients of the FSR, even though there are (n−1) shift register elements. The first (n−1) rows of the matrix indicate the shift of one position of a shift register element to the next right position. The modification of an actual content (rather than only a shift) is expressed in the last or nth row, wherein the new content of the first shift register element is determined by the actual inverters in the FSR or the coefficients of a representing polynomial. One limitation of the literature, including the Wikipedia article, is that these are limited to LFSRs and generally to binary LFSRs.

For cryptographic FSRs it is desirable to use p-state FSRs with p>2 or being non-binary and perhaps not being linear. The mathematical description as a representation of a p-state FSR by a polynomial of order k is very useful, even though an FSR or even an LFSR does not perform or execute a polynomial. In the case of a p-state non-binary FSR with k shift register elements one may determine a primitive and thus irreducible polynomial over GF(p) of degree k. The book Sequence Design for Communication by Fan et al. 1996, Research Studies Press, Taunton, England describes throughout and for instance on page 89 as expression (4.20) how Fibonacci FSR coefficients (inverters) and polynomial coefficients are related. In fact the inverters in the FSR are $(-h_i)$ mod-p of the ith coefficient in the representative polynomial. A representing polynomial over GF(11) of the FSR of FIG. 6 may be $x^3+0*x^2+2*x+4$ with inverter 1504 is (0) while the inverters 1505 and 1506 are (−2) mod-11 and (−4) mod-11. In a Matlab implementation this requires origin−1 inverters c0=2, c1=1, c2=10 and c3=8.

It is to be understood that other configurations also will work, such as c0 being greater than 2 in origin−1. However, primitive polynomials are relatively easily determined from which appropriate ML generators are determined. For instance the above mentioned Fan book lists tables of irreducible polynomials with c0=1 (in origin 0) and an ε value from which is determined if the polynomial is irreducible and primitive.

For m=3 the required ε is 1330 as listed in Fan on page 442, table A.14 where one can find coefficients 1024 with ε=1330.

The configuration as shown in FIG. 6 is determined by a primitive polynomial of degree 3 and by a 3 by 3 matrix. Each step in the device (for instance initiated by a clock-pulse) moves the individual states through the shift register and is equivalent and is represented by a vector representing a content of the shift register, matrix multiplied by the 3 by 3 matrix representing the FSR. With an initial content veci and a representing matrix A, the content after k steps is vecr=$A^k$.veci.

The DH variant using FSRs is then: two machines agree on a finite field or ring representation of operations and/or the representing matrix and an initial shift register content. While the system is illustrated with GF(n) with n is prime, the same system applies to FSRs described by GF(n=$p^q$) or extension fields with p prime and q an integer, as properly configured FSRs over GF(n=$p^q$) also generate ML sequences. The Alice machine generates a secret value k1 of FSR steps and may publish the resulting shift register content pba or the resulting matrix $A^{k1}$ as public key. The Bob machine does the same for a private key k2 and publishes resulting shift register content pbb and/or matrix $A^{k2}$. The Alice machine then computes $(A^{k2})^{k1}$ and/or pas=$A^{k1}$.pbb while the Bob machine computes $(A^{k1})^{k2}$ and/or pbs=$A^{k2}$.pba which each or both may be used as a common shared keyword. One may use commonly known shortcuts to compute $A^h$ with h being large. For instance repeat doubling or baby-step giant step methods may be used to make computation times reasonable.

For instance the matrix A based on FIG. 6 with applied illustrative inverters will be in Matlab notation A=[1 10 8; 2 1 1; 1 2 1] in origin−1. Assume k1=23 and k2=16 then A23=$A^{23}$=[4 4 11; 4 4 10; 7 4 5] and A16=$A^{16}$=[3 4 5; 11 3 2; 911 8] and $(A16)^{23}$=[1 11 11; 4 1 6; 8 4 4] and $(A23)^{16}$=[1 11 11; 4 1 6; 8 4 4]. Using initial vec=[2 11 4] will generate pba=$A^{23}$.vec=[9 6 5] and pbb=$A^{16}$.vec=[1 1 9], with psa=$A^{23}$.pbb=[4 7 11] while psb=$A^{16}$.pba=[4 7 11]. For illustrative purposes an FSR with m=3 shift register elements is applied. If one desires one may use m=2 (or even m=1) to limit the number of computations, or one may use longer FSRs to make successful attacks even less likely.

In accordance with an aspect of the present invention an FLT is applied to the machine matrix computation as explained above. This may be effected in different ways. One way is to apply an FLT with an n-state inverter in such a way that n-state inversion of the elements of the matrix provide their original representation. Assume that the original matrix has elements $a_{ij}$. An FLT as illustrated in FIG. 1 should create of inputted elements $c_{ij}$ inverted elements after inversion by inverter 101 'inv' after inversion so that inv $(c_{ij})=a_{ij}$. This means that $rinv(a_{ij})=c_{ij}$.

One may further obfuscate a source of a computational matrix by using a power $Ap=A^p$ as a public key. This may hide the structure of the FSR derivation.

As an illustrative example apply the 11-state inverter *7+4 mod-11, which is inv=[4 0 7 3 10 6 2 9 5 1 8] and rinv=[1 9 6 3 0 8 5 2 10 7 4]. One may create AF=rinv(A) previously provided, from A=[10 8; 2 1 1; 1 2 1] in origin-1 which gives AF=[2 8 3; 10 2 2; 2 10 2] in origin-1. Modify * mod-11 and +mod-11 in accordance with inv as for instance illustrated in FIG. 1. Using the same k1=23 for the Alice machine and k2=16 for the Bob machine. This will generate public key matrices matpa=$AF^{23}$=[4 4 5; 4 4 8; 6 4 1] origin-1 for the Alice machine and matpb=$AF^{16}$=[7 4 1; 5 7 10; 11 5 3] origin-1 for the Bob machine. The shared secret is then for the Alice machine matpb$^{23}$=[2 5 5; 4 2 9; 3 4 4] and for the Bob machine matpa$^{16}$=[2 5 5; 4 2 9; 3 4 4] which are the same as expected in a DH exchange. One may also use an initial state vector as a generator with AF. Using vec=[2 11 4], the public key are puba=$AF^{23}$⊙vec with ⊙ the FLTed matrix computation using the above FLT; and pubb=$AF^{16}$⊙vec, which generates puba=[5 3 4] and pub=[4 11 7]. The shared keys are then seca=$AF^{23}$⊙pubb and secb=$AF^{16}$⊙puba which are both [8 3 6] and the same as expected in A DH operation.

One may further obfuscate the use of an FLT by using an n-state inverter that leaves the elements of a public key including such as in a matrix unchanged but changes all or many or most of the elements. It is then for an attacker difficult to determine if an FLT is being applied as all intermediate public states will be valid states that may be generated with or without an FLT.

The above illustrations are what in the art is known as toy examples and will generally not used in a cryptographic exchange of data between machines or in any cryptographic application or device. In general one would like 'n' to be represented by a decimal number that has at least 10 digits, preferably at least 20 digits, more preferably more than 30 digits and most preferably at least 40 digits. Cryptographic security is generally defined as a binary number of around 130 bits. That means that n being represented by a decimal number of 50 bits will be secure. This means that each public key element may be at least 50 bit or about 7 bytes. A public key vector is then at least 7*k bytes wherein k is the number of elements in a public key.

The FSR representation is helpful to create a matrix (from a primitive polynomial) that is known to have a cycle of multiplication of n-1. A central server may provide via secure delivery such polynomials to the Alice and/or Bob machine. The FSRs from which the matrix is derived may be as small as 2 elements FSRs (or even 1 element if one uses a single inverter) which provides a 2 by 2 matrix based on a degree 2 polynomial. One may use any k by k FSR matrix with k>1, which may be based on Fibonacci or Galois FSRs. The more elements in a matrix, the greater the number of computations. However, such the cyclic nature may be deemed to require upping the size of n. As an alternate embodiment one may consider to use a matrix that has a cycle>n or preferably a cycle>2*n and more preferably a cycle>5*n. One such matrix is a vandermonde matrix. For instance the vandermonde matrix [2 3 5; 2 5 17; 2 6 26] in origin-1 has a cycle 211 for n=29. The matrix AV=[2 3 5; 2 9 65; 2 16 226] in origin-1 for n=233 has a cycle of 9049. One may also use $AV^2$, which is not clearly related to a vandermonde matrix. However, the cycle is then reduced to 4525. One is reminded that a ML FSR matrix for n=233 has a cycle 12,649,337.

In accordance with an aspect of the present invention, an n-state inverter is applied to reversibly modify a public key such as the intermediate result that is published to a receiving machine. One may encipher individual elements of a public key, for instance by direct inversion. One may also compute by machine an FLTed inverse of an element of a public key, for instance the FLTed multiplicative inverse based on an inverter of each element. If a matrix is part of a public key, one may have a machine compute an FLTed inverse of a matrix. It is assumed that an inverse of a matrix A exists as $A^{-1}$ so that $A.A^{-1}$=I with I the identity matrix and '.' the matrix multiplication. For a 3 by 3 matrix in origin 1, the identity is [2 1 1; 1 2 1; 1 1 2]. When n=233 and A=[8 79 101; 74 95 5; 9 3 97] in origin 1 then $A^{-1}$=[26 165 172; 170 220 10; 175 75 222] in origin-1 and their product is [2 1 1; 1 2 1; 1 1 2] and the inverse of $A^{-1}$ is A again.

In accordance with an aspect of the present invention, an FSR DH is performed using the inverse of the FSR matrix or the FLT of an FSR matrix. Depending on what a public key is, the application of the inverse matrix may contribute to confounding an attacker, making it harder to successfully attack and making a key exchange more secure.

In accordance with an aspect of the present invention, computation of a matrix inverse is modified based on an n-state inverter. In accordance with an aspect of the present invention, computation of a matrix inverse is modified in accordance with an FLT based on the n-state inverter. Assume an inverter inv233(i)=132*i+77 origin-0 which is adapted to origin-1 (which in Matlab is the statement inv233=inv233+1). The reversing inverter rinv233 is also computed with (in origin-1) zero-element z=rinv233(1)=41 and one-element e=rinv233(2)=11. A screen print of Matlab executable code for determining a matrix inverse based on an FLT generated by a computer is shown in FIG. 8. This is the function invmat(mat, scn, mgn, minn, z, e, n). The inputs are: 'mat' which is the matrix that is inverted, scn, which is the FLTed addition over GF(n), mgn, which is the FLTed multiplication over GF(n), minn which is the subtraction over GF(n), generally provided as switching tables, z being the FLTs zero element, e being the FLTed one-element, and n being n in GF(n), all in origin-1 wherein n is origin 1 is still n. It is believed that determining an FLT based matrix inverse is novel.

One will recognize the flow of matrix inversion, which requires minor determinant determination via function 'findetn' of which a screenshot is shown in FIG. 9. The inputs to 'findetn' are the same as in 'invmatn.' While determining a determinant is not novel, it is believed that determining an FLT based determinant of a matrix is novel. The Matlab program is recursive and calls itself repeatedly based on a size of the input matrix. The flow is similar as in known Determinant computations, but the functions are different as being FLTed. In particular one has to adjust for computations equivalent to + and − values as in lines 20 to 24 in FIG. 9. The program flows as shown in FIGS. 8 and 9 are illustrative and others are possible and are fully contemplated. The Matlab code is easy readable and serves as pseudo-code to illustrate the process and one of ordinary skill is believed to have no problems in understanding the flow as well as the functions itself. The Matlab code is easily converted in other programming language such as C#, Java, Python, Sage, Visual Basic, Magma and Sagemath or any assembly language or even machine language of a processor. Algorithms for matrix multiplication and matrix determination are plentiful. Unfortunately, they are all available only for straightforward computations over GF(n). Hence the inventor provides the herein provided illustrative examples to demonstrate practicality of FLT modification. The herein provided examples illustrate the effects of modification in view of a known signal flow. The herein provided examples are not necessarily the fastest of most efficient flows. However, the FLT may be applied to any of known faster and more efficient computations. These faster and/or more efficient methods in general obscure basic flows and thus may not illustrate actual workings without undue experimentation. For that reason very basic approaches have been used to illustrate effects of the FLT. It is to be understood that application of the FLT to faster and more efficient machine based algorithms are fully contemplated and thus aspects of the current invention are not limited to the herein provided illustrative examples.

Using A as above, but know using FLTed functions the inverse $AF^{-1}$ or inverse based on FLTed addition, multiplication and subtraction generates with invmatn the matrix $AF^{-1}$=[107 203 141; 226 54 184; 146 184 153]. FLTed matrix multiplication of A with $AF^{-1}$ will generate IF=[11 41; 41 11 41; 41 41 11] which is the FLTed identity matrix. It may be assumed to be close to impossible for an attacker to derive an unmodified matrix A let alone M from $AF^{-1}$ if A is the result of $A=M^k$ and the FLT and/or the related inverter and k are unknown to the attacker.

One may use smaller FSRs, for instance with 2 shift register elements. A matrix for a 23-state ML generator is B=[19 3; 1 0]. This requires fewer computations as the matrix is 2 by 2. One may use online available functionality in programming languages such as Sagemath or Magma to determine a primitive polynomial over GF(p) and then create an FSR matrix for either Fibonacci or Galois configuration and then modify in accordance with an FLT and preferably use a matrix not reflecting a zero-position as a public key. For instance $B^4$=[18 12; 4 11] may not reveal initially its FSR basis if one wants to hide that. Preferably, one applies an FLTed inverse of a matrix or an FLT inverse of a computed intermediate state for intermediate data exchange.

Hoffstein Crypto System

The book Hoffstein et al., An Introduction to Mathematical Cryptography, $2^{nd}$ edition, 2014, Springer, New York, N.Y. in section 7.1 pages 373-376, teaches a Congruential Public Key Cryptosystem ("Hoffstein system"). An Alice machine selects a large primitive q (or GF(q)), a factor f and g so that f<sqrt(q/2); sqrt(q/4)<g<sqrt(q/2); and gcd(f,q*g)=1. The Alice machine computes h=$f^{-1}$*g(mod q). A Bob machine has access to q and h and selects a factor r with 0<r<sqrt(q/2). With sqrt being the short name for square root. The Bob machine then computes, using a message m with 0<n<sqrt(q/4) a ciphertext e=r*h+m mod q and sends cipher text e to the Alice machine. The Alice machine computes a=f*e (mod q) and then computes b=$f_g^{-1}$*a (mod g). Herein $f_g^{-1}$ is the multiplicative inverse off (mod g). The result b is identical to original message m. One can check that m is recovered by substitution which results in a=f*($f^{-1}$*g*r)+f*m=g*r+f*m and a*$f_g^{-1}$(mod g)=g*r*$f_g^{-1}$+$f_g^{-1}$*f*m (mod g)=0+1*m=m.

In accordance with an aspect of the present invention, the Hoffstein system is modified by an FLT. The relevant elements (q, f and g) under the preset conditions are generated, preferably at random and h is computed. The boundary conditions of f and g are important to the correct working of the system. In order to apply the FLT, first q, f and g are determined and then a q-state reversible inverter or inverter rule invq is determined. One may determine fq=rinvq(f) and gq=rinvq(g). One then determines hq=rinvq(h) as a public key with hq=$fq^{-1}$⊛gq with ⊛ being the FLT of * mod q. A Bob machine then selects an r and m based on preset conditions and determines rq=rinvq(R) and mq=rinvq(m) and computes eq=hq⊛rq⊕mq with ⊕ being the FLT of +mod q.

In a numerical example take q=1021; g=21 and f=16; $f^1$=702; gcd(16, 21*1021)=1. Also the inverse off mod-g is $f_g^{-1}$=4. This will provide h=$f^{-1}$*g=448 mod q as public key. The Bob machine uses r=6 and m=5. The Bob machine generates e=rh+m=651 which is sent to the Alice machine. The Alice machine computes a=f*e (mod q)=206 and the b=a*$f_g^{-1}$ mod g=206*4 mod g=5 which is the original message.

Let both machines have access to q-state inverter invq(i)=76*i+170 mod-q. The Alice machine uses the original data and computes h which is 448, but applies the reversing inverter rinvq(h) to create the FLTed public key, which is hf=541. The Bob machine computes ef=rf⊛hf⊕mf wherein rf=rinv(r)=777 and mf=rinv(m)=468 and ⊛ and ⊕ are the FLT of * mod-q and +mod-q respectively in accordance with q-state inverter inv. This provides for cipher text ef=987 (instead of original e=651). The Alice machine may then determine the "original" or not-FLTed signal e=inv(ef)=inv(987)=651 and complete decryption as in the original Hoffstein system. The exchange in the FLTed system is thus hf=541 and ef=987, instead of the unmodified system h=448 and e=651. With no further data exchange it will be extremely difficult for an attacker to derive the clear text from public data.

In accordance with a further aspect of the present invention, $hf^{-1}$ and $ef^{-1}$ may be computed relative to ⊛ the FLTed function of * mod q, with $hf^{-1}$=617 and inverse of $ef^{-1}$=989.

Hoffstein's book describes a possible successful attack as finding a pair (F,G) from an equation F(1,h)-R(0,q)=(F,G). However, such an attack equation is also modified by the (secret) FLT and as long an attacker does not know the FLT or related q-state inverter there is no to little expectation of a successful attack.

Hoffstein's book at pages 417-425 sections 7.10.1 and 7.10.2 teaches the related NTRUEncrypt system. An Alice machine applies integers p and q with p<<q for polynomial selection f(x) and g(x) with coefficients in GF(p) and GF(q) or in rings Z/q and Zp. The Alice machine computes Fq=$f^{-1}$ (mod q) and Fp=$f^{-1}$(mod p) and computes h=Fq*g (mod q) being a polynomial multiplication, all polynomials being truncated as mod $x^n$–1. The polynomial coefficients of h are a public key transmitted to a Bob machine. The Bob machine selects a random polynomial r and a message m represented by a polynomial, and computes coefficients of a polynomial e=ph*r+m (mod q). The Alice machine computes a=f*e (mod q) which generates pg*r+f*m (mod q). Alice center-lifts 'a' and multiplies with Fp (mod p) to recover m. Hoffstein provides conditions for selecting p, q, m and r for this form of encryption/decryption to work, which is presumably PQ and quantum safe.

As with many PQ cryptographic methods, there is a high demand for computational resources to execute the switching operations to perform the NTRU tasks especially in time. Thus NTRU (both signature generation and validation and encryption decryption) may benefit substantially by limiting the operational size of n in $x^n-1$ and q (p is generally p=3). One can achieve that by applying an n-state reversible inverter and/or a related FLT of public key exchange.

In accordance with an aspect of the present invention, a public key and/or signature in the NTRU system is enciphered with an n-state reversible inverter that is known to both the Alice and Bob machine. The encipherment may be reversed at the receiving end, where the normal NTRU operation is performed. In case of NTRUEncrypt the signal e=ph*r+m is encrypted by the Bob machine with the n-state reversible inverter and transmitted to the Alice machine, where at least reversing of inverter encryption takes place. Recommended NTRUEncrypt parameters range from N=167 to 503 and g=128 to 256.

In accordance with an aspect of the present invention, one or more public keys are encrypted by computing the multiplicative inverse of h and/or e with an FLT that is based on a n-state inverter available to two machines that are exchanging NTRU processed messages. Such an encryption may increase the security of NTRU. For instance an NTRU method using N=167 and q=128 may achieve security beyond N=503 and q=256 by applying the FLT at a combined much lower computational effort than the N=503 and q=256 computational requirements.

The Hoffstein book provides several numerical examples to illustrate NTRU. One example is Example 7.5.3 at page 423 with q=41, p=3, N=7 (max degree is 6) $f(x)=x^6-x^4+x^3+x^2-1$. Use $g(x)=x^6+x^4-x^2-x+1$ (which has a multiplicative inverse in GF(41). The multiplicative inverses: $Fq(x)=f^{-1}$ (mod q)=$8x^6+26x^5+31x^4+21x^3+40x^2+2x+37$ and $Fp(x)=f^{-1}$ (mod p)=$x^6+2x^5+x3+x^2+x+1$ and $g^{-1}=12x^6+36x^5+8x^4+38x^3+19x^2+39x+13$ mod 41. The public key in this example is h(x)=Fq(x)*g(x) (mod q) wherein * indicates a polynomial multiplication with may be expressed as a convolution. This generates $h(x)=28x^6+25x^5+33x^4+18x^3+7x^2+28x+26$. An attacker presumably is unable (or it is very hard) to determine f(x) from h(x). In accordance with an aspect of the present invention an FLTed multiplicative inverse of h(x) is determined.

An 41-state inverter based FLT is executed, for instance using inv41(i)=15*i+21. The computer operation represented by multiplication modulo 41 is FLTed based on the above inverter. Other types of inversion, including interleaving steps, and permutation mappings may be used, as long they are reversible (or invertible) operations. This will generate coefficients [7 16 36 29 28 7 24]. The original coefficients may be recovered by again applying the FLTed inversion. The Hoffstein book also generates r=phr+m which is a polynomial of degree 6 with coefficients [31 19 4 2 40 3 25]. The FLTed inversion generates coefficients are [21 15 4 11 20 1 16] which are transmitted. The receiving machine may recover the correct coefficients again by FLTed multiplicative inversion. The NTRU decryption may be completed applying the rules as taught by Hoffstein.

Among preferred parameters of NTRU as for instance taught in NTRU Algorithm Specifications and Supporting Documentation, Chong et al, Mar. 30, 2019 and downloaded from https://csrc.nist.gov/Projects/post-quantum-cryptography/round-2-submissions which is incorporated herein by reference, is q being a power of 2. An NTRU toy example that is used in the literature to illustrate steps of NTRUEncrypt applies N=11, p=3 and q=32 with f and g being polynomials of degree 10 with coefficients fc=[1 −1 0 1 0 0 1 0 0 0 −1] and gc=[1 0 0 0 1 0 0 −1 −1 1 1]. The example provides h (with $h=f^{-1}$*g) with coefficients [13 29 20 19 9 10 13 4 30 23 24]. One may of course only determine multiplicative inverses when they exist and some do not exist for q=32. In accordance with one or more aspects of the present invention one may apply then one of 2 FLTed approaches. First, one may encipher the coefficients with a q that is prime and greater than 32 (or whatever the power of 2 q is in its application.) For instance, in this example one may use the FLTed inv41 for qr=41 as replacement for q-32, for coefficient encipherment only. This generates enciphered coefficients [38 18 40 15 39 17 38 4 14 23 26] that may be transmitted to a receiving computer that also has the inverter and recovers the original coefficients with which the coefficients of e=ph*r+m are generated which may be also enciphered as described.

The use of qr=41 in case q=32 reveals that potentially an FLT is applied. As a second solution one may also apply a multiplication over GF(32) as the basis of an FLT. The FLT will generate coefficients that are in the expected range of [0, . . . , 31]. Because there are different versions of * GF(32) (depending on the basis of modulo polynomial degree 5) both machines have to apply the same base polynomial. Assume that both machines apply modulo $x^5+x^2+1$ over GF(2). Using inv32(i)=19*i+7 will create 32-state inverter [928 12 25 15 30 14 31 21 8 24 5 19 2 18 3 1 20 4 17 7 22 6 23 29 16 0 13 27 10 26 11] which is a reversible inverter which is applied to generate the FLTed multiplication over GF(32) and the related inverses. Coefficients [13 29 20 19 9 10 13 4 30 23 24] will be enciphered by multiplicative FLT as [0 5 22 2 31 30 0 17 10 25 28] as public key and may be recovered by applying the FLT at the receiving end. In a next step a machine applies the public key and generates e=[28 4 5 7 16 31 8 3 13 20 31]. Applying the inverter for FLT enciphers e as ef=[24 17 29 7 14 9 27 11 0 22 9] which may be deciphered by a receiving machine.

The steps of NTRU (and basically of most other cryptographic message exchanges) in effect scrambles elements of public keys in a recoverable way. The recoverable way is that the steps may be reversed or that consecutive steps applied by two machines lead to a same result. One can see above in the NTRU examples that a relatively limited range of coefficients (basically using merely 3-states) leads to a very broad range of publicly transmitted coefficients. One may use the FLT or inverter based encryption/decryption on all exchanges in a cryptographic cycle, or one or on more than one but not all exchange steps. One may use the same inverters or same FLT on all data. One may also use different inverters. For instance exchange from the Alice machine to the Bob machine is based on a first inverter or inverter based FLT while the exchange from the Bob machine to the Alice machine uses another inverter or inverter based FLT. Furthermore, one has to take measures that a data-element does not represent a zero-element in the FLTed set, as a multiplicative inverse does not exist for the FLT. In that case one may catch the data-element pre-FLT and leave the element unchanged.

McEliece CryptoSystem (MEC)

One of the submission in the NIST Post-Quantum project is the Classic McEliece Cryptosytem (CM). In essence in MEC a public key PK is generated which is a generating n-by-k matrix G" formed from a generating matrix G, an invertible k by k matrix S and a permutation matrix P so that G"=SGP. A machine having access to G" generates a cipher message m'=G"m+e and a receiving machine having S,G and P as private keys deciphers m' by using $S^{-1}$ and $P^{-1}$. The underlying error correcting code in CM is a binary Goppa code. One issue with MEC is the size of the public key G" which is an k by n binary matrix with n up to 2048 and k=1751 with a public key of around half a million bits. For n=6960 and k=5413 in PQ applications a public key contains more than 8 million bits.

A difference between the original MEC and CM is the generation of the public key. The largest part of the public key is the generator matrix G or parity check matrix H (in accordance with a modification by MEC by Niederreiter). In text-book MEC there is a use of a scrambling matrix S and a permutation matrix P as private keys. In CM, the public key is the Goppa code parity check matrix part T after Gaussian elimination and the identity part is dropped from the systematic matrix H. No further scrambling matrix for T is used. As part of a ciphertext or a response a public codeword $C_0$=Encode(e,T) is generated, with $C_0$=He with $H_{(n,k}|T)$. In accordance with an aspect of the present invention $C_0$ is enciphered in accordance with an inverter based FLT. The ciphertext transmitted between computers in CM is C encapsulating the session key and is formed from C0 and C1 as per definition of the CM specification as available from the NIST post-PQ website. The length of $C_0$ is n-k bits C1 may be selected as a 256-bit hash. The parameter k is generally n-mt with $q=2^m$ (q is field size) and t being correction capability. The size of T is (n-k)×k bits. $C_0$ may have mt bits. A rough estimate of key sizes is provided in section 5.8 of the CM specification of the NIST submission, being ciphertext being 0.2*n bits and public key T being $0.16*n^2$ bits. There are different proposed CM variants, for instance mceliece8192128 (MC128) with 1,357,824*8 bit public keys and 240*8 bit cipher texts and mceliece6960119 (MC119) with 1,047,319*8 bit public keys and 226*8 bit cipher text and with MC128 presumably more secure than MC119.

In accordance with an aspect of the present invention the public keys in CM and in any variant of a McEliece or Niederreiter crypto system (including signature and encryption) are enciphered by a p-state inverter based FLT. Assume a sequence seq of 1 million bytes as an illustrative example, which is 8 million bits which may represent the matrix T. An encipherment of 1024 bits per symbol may be handled by a processor. That means that the sequence seq needs to be enciphered by 977 symbols of 1024 bits which requires at least an additional stuffing of the sequence with 576 bits to reach the required 977 bytes. In accordance with an aspect of the present invention, a finite field $GF(p=2^{1024})$ is applied as well as a p-state reversible inverter rule, for instance invp(i)=a*i+b with a and b selected from the finite field. This determines also a reversing p-state inverter. If the operation is limited to binary fields, one may apply as rule a permutation rule that permutes 1024 bits in a reversible way.

To compute all FLTed multiplicative inverses of about 1000 symbols may be too demanding for a processor. In that case the processor may just permute the symbols that represent the public key matrix T (in CM) or G (in MEC). Permutation rules can be established fairly easy by an FLSR for instance characterized by a primitive polynomial over $GF(2^q)$. An FLRS with a 10 bits shift register characterized by a polynomial of degree 10 and characterized by a primitive polynomial has $2^{10}-1$ unique shift register contents. The order of generation from a starting position may be assigned a memory position at which the state or content of the shift register is stored. For completeness the state represented the 0-state should be added. Preferably the 0 position should be modified in the representation, for instance being exchanged with a state in a predefined position (like the last or next to last) so 0 is not inverted to 0. One may then form the reversing inverter from the thus established inverter.

In accordance with an aspect of the present invention the ciphertext, and/or at least the $C_0$ part in CM should be enciphered by determining the FLTed inverse, based on a common p-state inverter available to both machines that are in communication. The ciphertext C0 and C1 are much smaller than the T and G matrices and thus FLTed inversion is not a major burden on the processor.

The CM ciphertext may still be large, like in the order of 250 bytes, which is still 2000 bits. However, BigInteger circuitry in a processor easily deals with that. In accordance with an aspect of the present invention a p-state inverter with p in the order of $p≈2^r$ is available to both machines. The p-state inverter may be one with p being prime or p being a power of 2. In any case a machine operation defining a multiplication mod-p or over GF(p) is available. The processor then applies an FLT based on the p-state inverter on the symbol representing a ciphertext in CM or MEC to generate an FLTed multiplicative inverse which is transmitted to a receiving machine where the original ciphertext is recovered by reversing the FTLed inverse. The ciphertext may be split into 2 or more smaller bit sequences thus representing smaller valued symbols, which may require smaller (smaller p) inverters. In accordance with an aspect of the present invention, one may consider a split up of q bits (if needed packed with random bits) to create d bit sequences of q/d bits that may be arranged in a square matrix. This means that for instance q bits are split into 4 sequences of q/4 bits. Each q/4 sequence is then considered to represent an element $p_n≈$mod$-2^{q/4}$ for instance preferably being prime or in a $GF(2^{q/4})$ symbol in a matrix M. In accordance with a further aspect of the present invention an FLTed inversion of M being $Mif^{-1}$ is generated based on an $p_n$-state inverter.

This is not a closed inversion. In other words, one cannot determine $Mif^{-1}$ from the inverse $Mi^{-1}$ of M by inversion of matrix elements. For instance use p=41 and the 2 by 2 matrix M41 in origin 1 M41=[4 34; 29 12] with inverse M41i=[2 39; 32 5] all in GF(41). Using inv41(i)=16*i+10 mod 41 (and then moved to origin 1), will generate data represented by FLTed inverse matrix M41if=[8 36; 14 35]. One may check that the elements of M41i and M41if are not inverted versions of each other.

One problem that may arise is that a matrix may turn out not to be invertible. One solution is to select a size $p_n≈p/4$ that is greater than p/4. This allows each p/4 sequence to have a number of dummy bits that are meaningless to the ciphertext and that may be added and removed from the sequence before and after FLT. For instance each symbol is represented by pn bits of which nm bits are meaningless. These nm bits may be selected in such a way that an invertible FLTed matrix may be generated. The selected bit sequences are then processed as representing a matrix of which an FLTed inverse is computed. Again inverting at a receiving machine recovers the original bit sequences of which the meaningless bits are stripped and the ciphertext is recovered, which may then be processed in accordance with the error correcting code processing.

Because of the additional level of security by the application of the FLT, one may thus apply a lower security level CM or MEC encryption and still achieve a much higher level of security than de highest defined level CM or MEC codes. In accordance with an aspect of the present invention machines in communication both have access to different and synchronized inverters and synchronized in the sense that both machines are configured to apply the same inverters. There are different ways to achieve that. One way is to provide each inverter with a unique and secret identifier and wherein one machine instructs the other to apply a specific and secret inverter. This approach allows two machines to keep using the same public key (T or G) while the ciphertext is enciphered with different FLTs.

The inventor has observed that matrix multiplication of one constant matrix with a variable one, is, depending on the position of the variable matrix being the multiplier or multiplicand, reflected on a row basis or a column basis. That is: in matrix multiplication G"=S*G*P changes in a row in S is reflected in a change of row in G" and change in a column of P is reflected in a change in column in G".

In accordance with another aspect of the present invention a method and circuit is provided that modifies a previously transmitted G" using a public key C" that is significantly smaller than G. This allows a modification of matrix G" to Gm" by modifying 1 or more rows or columns in G" by transmitting the modified parts as a new public key. A relatively small but still significant modification may be achieved by modifying one or more rows in scrambling matrix S or one or more columns in permutation matrix P. Such modifications have to comply with the conditions of S and/or P. That is: a modified S (with some modified rows) has to be invertible. A modification of columns in permutation matrix P has to be invertible and each row still has only one bit being represented by a 1 (or state High for a switching circuit).

An illustrative toy example of an MC cryptosystem is provided at website ss-1 by Prof Bill Buchanan OBE dated Oct. 6, 2020 which incorporated herein by reference. This is an example of what is generally called a textbook MEC. The generating matrix G is related to a Hamming (7, 4) code. The matrix G is modified by a 4 by 4 scrambling matrix S and a 7 by 7 permutation matrix P. The matrix S (in row Matlab representation) is S=[1 1 0 1; 1 0 0 1; 0 1 1 1; 1 1 0 0]. And G=[1 0 0 0 1 1 0; 0 1 0 0 1 0 1; 0 0 1 0 0 1 1; 0 0 0 1 1 1 1] and P=[0 1 0 0 0 0 0; 0 0 0 1 0 0 0; 0 0 0 0 0 0 1; 1 0 0 0 0 0 0; 0 0 1 0 0 0 0; 0 0 0 0 0 1 0; 0 0 0 0 1 0 0]. And G'=S*G*P=[1 1 1 1 0 0 0; 1 1 0 0 1 0 0; 1 0 0 1 1 0 1; 0 1 0 1 1 1 0].

Matrix S is modified in the first row to Sm=[0 0 1 1; 1 0 0 1; 0 1 1 1; 1 1 0 0] which is invertible. The matrix Gm'=Sm*G*P=[1 0 1 0 0 0 1; 1 1 0 0 1 0 0; 1 0 0 1 1 0 1; 0 1 0 1 1 1 0] which is G' with the first row changed. In accordance with an aspect of the present invention, a textbook implementation of MEC and/or MC is performed. Herein the original McEliece generator matrix G or parity matrix H is used without being modified into echelon or systematic form. The matrix G is modified by scrambling matrix S and permutation matrix P into G'=S*G*P. The data of G' is transmitted (be it as is or enciphered) to a receiving device as public key. This may be a large dataset and preferably it is used in a set-up phase. The dataset may be used as an operational public key. Preferably, the scrambling matrix S is modified in at least 1 row, but preferably in at least 2 rows, preferably up to 1% of the rows, preferably up to 5% of the rows, more preferably up to 10% of the rows and if so desired up to 25% of the rows, so that the modified matrix Sm is invertible. The new and row modified matrix Gm' is determined and only the modified rows are transmitted as public key to a receiving device.

The machine may operate under a protocol that provides preset row numbers of rows that are modified. One may encipher the row numbers and include them in the public key. One may also use an p-state inverter and encipher the sequences of bits in the modified rows as p-state symbols. At any rate, a receiving device modifies its existing received matrix G' into Gm' with the modification applied and computes the ciphertext and transmits the ciphertext to the device that published the public key. Because the Alice device has the correct matrices, it can then compute the text from the received ciphertext, which may be the common keyword. The ciphertext may be enciphered by an FLT as explained earlier. One may apply also a modification of predetermined columns of the permutation matrix to reduce a size of a public key word.

A modification of G' permeates the generated ciphertext and modifications may be limited to a small number of rows. This may dramatically reduce a size of a public key, for instance to a single row which has n bits. So, 10 rows modified if n=1024 would require a public key of 10 kilobit. This may be translated in 4 sequences of 2.5 kbit, which may easily be represented as a 4 symbol matrix which may be inverted under FLT rules. This adds further security by FLT to the above use of only modified rows and/or columns of a public key matrix. This easily allows an at least 10 times smaller public key with at least the same level of security. The scrambling effect of echelon/systematic elimination may generally not be used as it will affect multiple rows that may make the number of changed rows too large to achieve meaningful reduction in a public key.

In accordance with an aspect of the present invention a key exchange system represented by ct=W*m+e is provided. In a variation thereof a system ct=W⊛m⊕e is provided, wherein ⊛ and ⊕ are FLTed versions of mod-p operations or operations over GF(p). In a further variation $ctf^{-1}$ is computed and transmitted as ciphertext, wherein ct⊛$ctf^{-1}$=onef, with onef being the one-element of ⊛.

An Alice machine determines a sequence of data elements that is represented by an invertible matrix, or $W^{-1}$ exists. The matrix W may be transmitted as public key. It may also be enciphered in accordance with a scrambling matrix or by an FLT inversion. In any case, a receiving Bob machine receives W or may recover W. Furthermore, the Alice machine may publish an error vector e which exists mod-p or in GF(p). Both the Alice machine and the Bob machine have access to a secret p-state inverter. The Bob machine generates a message m preferably randomly, which is encoded as a p-state vector. The Bob machine generate ct=W⊛m⊕e using FLTed operations. There are few limitations in selecting m and e, as opposed to other cryptographic methods. Preferably one should eliminate messages that contain many zero elements.

The Bob machine then computes $ctf^{-1}$ as FLTed ciphertext. If so desired the Bob and Alice machine may apply at least two different p-state invertors. One for the ciphertext operation and one for the FLT inversion of the ciphertext. The Alice machine receives for instance $ctf^{-1}$ and recovers ct using a first FLT. Depending on a size of $ctf^{-1}$, one may invert the individual elements of $ctf^{-1}$ if it has multiple elements. In a further configuration ct is represented as a matrix and is FLT inverted. The Alice machine recovers ct and computes cte=ct⊖e with ⊖ the FLT of the subtraction operation. This generates cte=W⊛m. The message m is then recovered by performing mr=$W^{-1}$⊛W⊛m=m.

As an illustrative example use p=41. Use a encipher matrix in origin 1 w41=[4 34; 29 12] which is invertible to w41i=[2 39; 32 5]. Use an error vector e=[3 24]. Generate m=[15 16]. Compute W*m=[5 25] and compute W*m+e=[7 7] (all in origin-1). The compute [7 7]-e=[5 25] of course and compute $W^{-1}$*[5 25]=[15 16]. Using inv41(i)=16*i+10 mod 41 for FLT will generate W⊛m=W⊛[15 16]=[32 19] and W⊛m⊕e=[4 12]. If so desired [4 12] may be FLT inverted on individual elements with another inverter and/or represented as a matrix and FLT inverted. For this example [4 12] is transmitted by the Bob machine to the Alice machine. The Alice machine computes [4 12]⊖e=[4 12]⊖[3 24]=[32 19] and computes Wf$^{-1}$⊛[32 19]=[15 16] with Wf$^{-1}$=[8 36; 14 35] which is the FLT inverse of W. In a further variation, devices may also be instructed to compute ct=W⊛(m⊕e), which requires at a receiving machine computing cint=W$^{-1}$⊛(W⊛(m⊕e)) followed by m=cint⊖e. In a further variation one may use p-state inverters on n-state symbols with p>n and the related FLT.

The operations ⊛ and ⊕ are the FLT of p-state reversible operations * and + and * and + may be replaced and FLTed with any reversible p-state operation. One may change also an order of data elements, as in NTRU where e=r*h+m mod q and m is in effect a modification of r*h. When not being limited by a size of r and m, one may use h as a static public key (that is FLTed as described) and r is provided as a variable public key. One or more of publicly transmitted data may then be FLTed as described earlier. In case of e=r*h+m, one may FLT the term e.

Herein methods and circuitry are disclosed to improve security of cryptographic exchange of data between at least two computing devices in communication via a physical channel. An exchange of data includes at least one machine and generally two machines each performing physical switching operations. The switching operations may be represented by a descriptive mathematical expression. However, the machine itself does not perform mathematics, but is strictly a configured physical device that changes states of physical devices, usually between states Low and High. A physical device, of course, does not "know" a value of a state, which is strictly a human interpretation. It is popular to represent internal physical states by 0 and 1. However, such states do not exist in nature. The states have physical values, commonly on data sheets indicated as Voltages Low and High and of which the actual value depends on used technology like CMOS technology. This sometimes confuses people to believe that internally to computers something like symbols exist. Hey don't. Only physical states exist as originally explained by Claude Shannon in his MIT Master of Science thesis "A Symbolic Analysis of Relay and Switching Circuits". How mathematical logic description, for instance in a high level descriptive and computer executable language like APL, relates to physical realization is taught in Gerrit Blaauw, Digital System Implementation, Prentice Hall, 1976 which is incorporated herein by reference. It explains how arrangement of physical switching devices (in Blaauw usually NANDs) leads to switching operations that perform in accordance with an arithmetical description. A computer cannot spontaneously perform arithmetic. It has to be physically built and configured, including provided with appropriate input and output devices. The FLT modifies internal computer configurations with as results currently unknown and hard to attack novel configurations, which increases the security of devices (against side channel attacks for instance) and message exchange between devices. FLT operations in a mathematical sense do currently not exist. They are to be interpreted as a description of internal computer operations and/or configurations. The FLT is believed to be not conventional, routine and/or well understood and to be entirely novel in creating novel computer configurations that have as a benefit to offer a higher level of security.

The use of mathematical terms like addition and multiplication over GF(p) and multiplicative inverse may appear to imply mathematics and to be functional. It is to be understood that these terms are strictly used as representation for computer circuit configuration and in particular computer switching configuration. The engineering term used for this representation is sometimes known as Computer Arithmetic, which is a science related to hardware design of Arithmetical circuit design. A simple illustration may be the term addition over finite field GF(n=2$^q$). While it looks like mathematics, it is in fact a representation of bitwise XORing of 2 words of q bits, with an XOR being a 2 input/one output 2-state switching device that switches states in accordance with a logical "exclusive or" function. All descriptive and functional appearing terms used herein refer to physical devices that perform well defined circuits and controlling instructions. One of ordinary skill will understand how these terms are related to physical devices, usually located in an Arithmetic-Logic Unit (ALU) of a processor. An example how to design or realize computer operations in accordance with machine related instructions (the switching operations) can be found in Intel 64 and IA-32 Architectures Software Developer's Manual, available online at https://www.intel.com/content/dam/www/public/us/en/documents/manuals/64-ia-32-architectures-software-developer-instruction-set-reference-manual-325383.pdf Descriptions of specific multiplication circuits and implementations are provided in the earlier mentioned Blaauw book.

Thus terms like multiplication, addition and subtraction are, unless stated differently, intended to mean machine operations that perform operations that may be described by these terms, even though the machine operations are not mental operations. The operations thus cover circuitry such as configured circuitry or dedicated customized circuitry such as FPGA circuitry and are in case of processors performed by circuitry that executes the intended term by one or more instructions as available in a processor instruction set. It is observed that processors have physical limitations set by size of words for instance that do not apply to mental or human operations. Another difference with humans and mental operations is that processors operate on a much higher speed that cannot be matched by any human. This brings solving issues posed by the cryptographic methods and circuitry outside the realm of being solved by humans within a lifetime of even 100 years be it with or without paper and pencil.

Any processor executed expression or instruction, such as in Matlab in the examples or in APL as in the Blaauw book or any other processor executed instruction and/or instruction set establishes a physical circuit. While the uninformed observer may believe that a mental process is executed by a processor, a processor does not perform mental processes but establishes physical circuit configurations as it executes instructions.

FLT modified key exchange methods and circuitry have been provided herein. They included novel key Post Quantum exchange and key encapsulating methods as being pursued in the PQ project of NIST of which all Submissions in Round 1, Round 2 and Round 3 as published and available on https://csrc.nist.gov/projects/post-quantum-cryptography are incorporated herein by reference. Specifically Isogeny based cryptography, including SIKE, SIDH and CSIDH, NTRU like methods like NTRU and NTRU Prime and McEliece based methods are FLT modified as explained herein.

It is to be understood that any cryptographic method that includes public exchange of data may be modified in accordance with an FLT using common n-state inverters held secret by 2 computing devices. This includes data exchange for authentication and digital signatures of which at least the public portion may be inverted by an FLT to encipher a data element into the FLTed multiplicative inverse which may be recovered by a receiving device having access to the related FLT, FLT rule and/or FLT circuitry.

Most of the NIST PQ submissions (and certainly in the third round submissions) include a Key Encapsulation Mechanism (KEM). The KEMs as required in SIKE, NTRU and CM are different. For instance SIKE uses three hash functions (F, G and H) in its KEM, which is a SGA-3 derived SHAKE256. The SIKE KEM is built on top of SIDH. Accordingly, one may apply the disclosed modifications of SIDH as provided herein and then apply the KEM to the modified SIDH outputs. One may modify with an FLT any of the applied hash functions. For instance a bit-wise word of q bits based XOR may be replaced with a p-state FLT with $p=2^q$. The same applies to any other bitwise operation on words of q-bits, like AND and XOR as used in FIPS 180.2 functions (4.1) to (4.13) for instance. SIKE defines a function Enc wherein j=isoex2(pk3, sk2), h=F(j) and c1=h (XOR)m. The determination of c1 may also be modified by an FLT as h and m are multi-bit words. Furthermore, an attacker may try to use a difference between a hash of j and a hash of an FLTed j to try to find the inverter that determines the FLT. This can easily be addressed by using an FLT to modify a used hash function.

The NTRU KEM, like other proposes PQ KEMs, and generates a ciphertext and a shared key. The same observations as above apply. The same applies to Classic McEliece. The original and herein modified Public Key Encryption (PKE) is in all cases the engine of the KEM and thus benefit from the FLT modifications as described herein. Several KEMs form a public transmission of a combination c0, c1 wherein c0 is for instance a public key generated during encryption and c1 is an encoding such as a ciphertext. One may FLT modify c0 and/or c1 individually and/or with different FLTs or one may combine c0 and c1 as one sequence of bits and FLT the combined sequence.

Digital signatures may be recognized as classical digital signatures including the FIPS 186-4 Digital Signature Standard (DSS), RSA signature, El Gamal signature, ECDSA signature and other elliptic curve signatures, the Schnorr signature, the Feige-Fiat-Shamir signature and other zero-knowledge identification schemes as well as PQ signatures and identification schemes, for instance as described in the Wikipedia article Post-quantum digital signature at https://en.wikipedia.org/wiki/Post-quantum_cryptography which is incorporated by reference all include an exchange of messages which may include a public key, a signature message, a hash or a challenge message may all be modified partially or in their entirety by FLT as described herein. Blockchain and crypto-currencies rely strongly on signatures and authentication of transaction wherein some of the above or other ID schemes are applied. The security of blockchain and crypto-currency is increased by using the FLT as described. It limits the machines that participate in valid transactions to ones that have access to n-state inverters. In a sense an n-state inverter acts as a certificate, and one that changes operations to generate messages and data.

Figure 10:
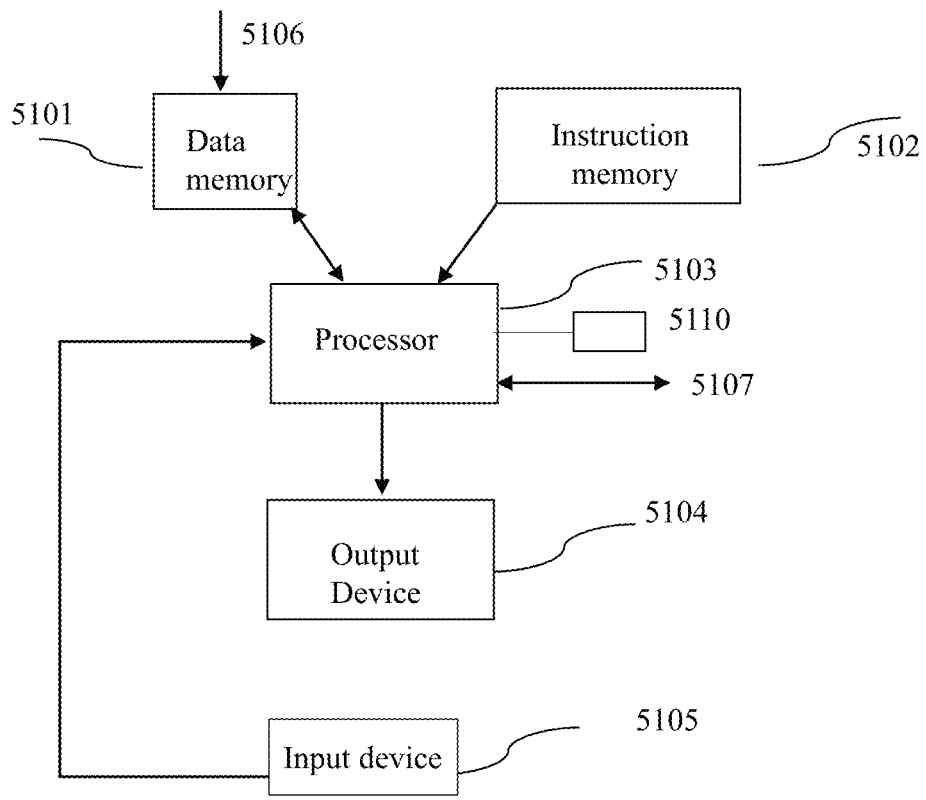
FIG. 10 illustrates a processor based computer system.

A system illustrated in FIG. 10 and as described herein is enabled for receiving, processing and generating data. The system is provided with data that can be stored on a memory 5101. Data may be obtained from a sensor or may be provided from a data source. Data may be provided on an input 5106. The processor is also provided or programmed with an instruction set or program executing the methods of the present invention is stored on a memory 5102 and is provided to the processor 5103, which executes the instructions of 5102 to process the data from 5101. Data, such as an image or any other signal resulting from the processor can be outputted on an output device 5104, which may be a display to display data or a loudspeaker to provide an acoustic signal. The processor also has a communication channel 5107 to receive external data from a communication device and to transmit data, for instance to an external device. The system in one embodiment of the present invention has an input device 5105, which may be a keyboard, a mouse, a touch pad or any other device that can generated data to be provided to processor 5103. The processor can be dedicated hardware. However, the processor can also be a CPU or any other computing device that can execute the instructions of 5102, for instance provided in a form of instructions in a programming language. The processor 5103 in some embodiments has integrated or connected to it communication circuitry 5110 with a customized physical interface. A customized interface may be a connector, an antenna, a reader or read/write interface or any other physical interface to transmit and/or receive signals to or from an external device. Accordingly, the system as illustrated in FIG. 10 provides a system for data processing resulting from a sensor or any other data source and is enabled to execute the steps of the methods as provided herein as an aspect of the present invention and provide the results on an output.

Figure 11:
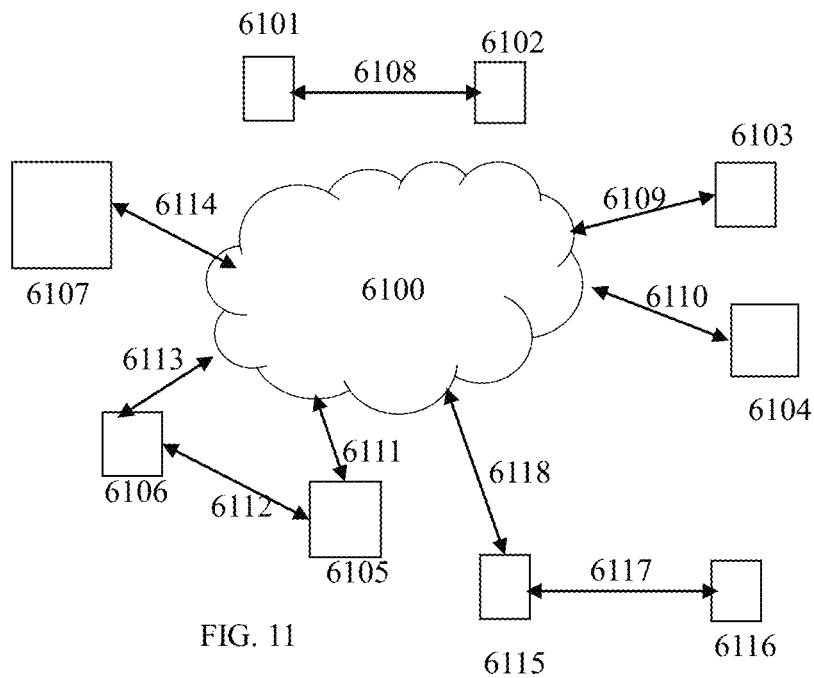
FIG. 11 illustrates a network of computer devices.

Several computing device community configurations are illustrated in FIG. 11. FIG. 11 has a communication network 6100. Network 6100 may be a single network such as a wireless or wired network or a combination of networks such as the Internet. The network may be a switched network or a packet based network, a private network or a public network or a virtual private network or any other communication network that enables connection of 2 computing devices and of 3 or more computing devices. In one configuration two computing devices 6101 and 6102 with communication circuitry to transmit, receive or transmit/receive signals are provided. The communication circuitry of 6101 and 6102 can transmit signals over a channel 6108. The channel 6108 is identified as a double arrow. This indicates that the channel is bi-directional, but it does not necessarily mean that 6101 and 6102 do both have to transmit and receive, though they may. For instance 6101 is an opening device or a smartcard or any other transmitting device and 6102 is a computing device that is part of an access mechanism that is being activated by one or more signals from 6101. Device 6101 for instance has cryptographic circuitry that generates opening signals that have to be detected and decrypted by 6102. For that application wherein each device has the appropriate instructions and data stored to complete an authenticated transaction, like opening. In one embodiment of the present invention there is thus only one way transmission by 6101 and receiving of data by 6102. The channel is a direct channel, like a wireless or wired or Near Field Communication (NFC) channel, a USB connection, a Bluetooth connection or any other direct connection. For the transaction itself no other channel is required. The devices 6101 and 6102 may have other communication capabilities, such as equipment to connect to network 6100, but are not shown. Devices 6101 and 6102 have different modified n-state switching functions stored on local memory. These may be updated from time to time.

Devices 6101 and 6102 may also perform some mutual authentication or for instance key exchange. In that case 6108 is a dual use (send and receive) channel and the devices 6101 and 6102 both have send a receive equipment. The same applies to devices 6103, 6104, 6105, 6106, 6107 and 6115 and 6116 and communication channels 6109, 6110, 6117, 6118, 6111, 6112, 6113 and 6114.

Computing devices 6103 and 6104 communicate with each other via channels 6108 and 6110 via network 6100. Cryptographic n-state switching functions may be stored locally and may be provided by secure server 6107 which is connected to network 6100 via channel 6114.

Device 6115 and 6116 communicate directly via a channel 6117. Device 6115 is also able to communicate with secure server 6107 via channel 6114. Devices 6105 and 6106 can directly communicate with each other over channel 6112 and with server 6107 via 6100 over channels 6111 and 6113, respectively. As needed 6105 and 6106 can also communicate via 6111 and 6113 via network 6100. Any of the communication channels, even though illustrated by double sided arrows may be single direction as dictated by practical circumstances.

For instance devices 6115 and 6116 communicate directly via 6112 to complete a transaction, such as withdrawing money from an ATM 6115 machine with a smartcard 6116 and 6115 uses 6118 for verification from 6107 via network 6100. Assume 6116 to be a chipcard or smartcard which is connected to 6115. During an established connection 6116 can be updated with additional or replacement modified n-state switching functions.

Computing devices can be mobile or fixed. For instance 6103 and 6104 are two computing devices that are connected to the Internet, for instance 6103 is a computer, such as a PC, a smartphone, a tablet and 6104 for placing an order and 6104 is a server for processing the order. For instance 6103 is a computing device which may be a server, a computer, a PC, a smartphone, a tablet, a processor and the like to monitor and/or control an IoT (Internet of Things) device 6104 with a processor such as a camera, a medical device, a security device such as a lock or fire monitor, a thermostat, an appliance, a vehicle or any other device.

One of ordinary skill will realize that the herein disclosed novel and inventive aspects increase security of computer based messages and messaging over a network, including phone networks and the Internet. In accordance with a further aspect of the present invention computer instructions that perform operations in accordance with these aspects are a) stored on a memory and/or storage device and/or b) part of an instruction set on a computing device and/or c) included as an instruction set in an Internet browser including one such as Google Chrome™, Microsoft Edge™, Firefox™ among others and/or d) part of an instruction set of an application or app that is used in communication between at least two computing machines and/or e) as instructions and/or circuitry on a device such as a chipcard or smartcard as described in https://en.wikipedia.org/wiki/Smart_card and/or f) any other use in an exchange of data between at least two computing devices.

All terms related to operations, including transformations, inversions, processing, instructions, arithmetical operations, modulo-p operations, operations over GF(p), transmissions, receiving are fully and explicitly to be machine and/or circuit and/or processor and/or discrete circuits and/or FPGA based operations and not mental operations. Any cryptographic operation herein is specifically a machine operation. A data element is a machine state that may be materialized as a signal. Unless expressly stated differently, a data-element is represented by an n-state value with n an integer greater than 2. A data-element may be 2 or more bits or binary states and is processed under an FLT as an n-state unit. An exchange of data between machines may be a message of one or more data-elements, which unless stated differently are one or more n-state data-elements with n an integer greater than 2.

A machine multiplication is a machine operation of two operands. A machine multiplication with a first operand that is a one element and a second operand has the second operand as output. A machine multiplication with a first operand that is a zero element and a second operand has the zero element as output. A machine multiplication with a first operand and a second operand that is its multiplicative inverse has the one element as output. In an FLTed machine multiplication a zero-element may not be 0 and a one-element may not be 1 in a origin–0 representation of operands.

A public key (PK) or public key exchange (PKE) cryptographic system establishes a secret keyword after public data exchange. The PK/PKE system may determine a common secret key after exchange of 2 components between machines such as in Diffie Hellman. It may also be a system wherein one machine determines or generates a key that is encrypted transmitted to another machine and then decrypted, causing two machines having the same key. A key encapsulating system is also considered a public key system herein, unless explicitly said to be different.

One aspect of the present invention disclosed herein is the encryption of a data element A by determining an FLT based multiplicative inverse $A_{flt}^{-1}$. The inverse $A_{flt}^{-1}$ is defined as $A_{flt}^{-1} \circledast A$=onef, wherein $\circledast$ is the FLT based on a reversible n-state inverter of the operation *, which is the machine operation described as a multiplication over GF(n) or a multiplication mod-n. The term onef is the one-element or neutral element of $\circledast$ so that A$\circledast$ onef=A. Determination of $A_{flt}^{-1}$ is non-trivial. One way is to create a switching table of $\circledast$ and find in the row or column related to A and index for which the row or column element is onef. This works only if n is small enough to generate the switching table or at least the related row or column. Another way is to use the inverter rules of the FLT and apply the Extended Euclidean Algorithm based on finding a remainder, using FLTed multiplication, addition and subtraction. Yet another way is to determine Ai=inv(A), determine the normal multiplicative inverse Ami of Ai related to * (so that Ai*Ami=1) and then determine $A_{flt}^{-1}$ as $A_{flt}^{-1}$=rinv(Ami), with inv being the n-state inverter rule and rinv being the related reversing n-state inverter rule.

Accordingly $A_{flt}^{-1}$ is not simple to determine and takes computing efforts. Furthermore it is impossible or extremely hard to determine A from $A_{flt}^{-1}$ without knowledge of A and the inverter rule. This makes, under a condition of a secret n-state inverter and/or inverter rule, encryption as disclosed highly effective and dramatically increases security.

In a similar sense one may arrange a data element, which in most cases is a representation of bits, into at least 4 separate elements that may be combined into the data-element. The at least 4 elements may be considered or arranged as a matrix B of which the FLTed inverse matrix $B_{flt}^{-1}$ is computed so that $B_{flt}^{-1} \circledast B = I_{flt}$ with $I_{flt}$ the FLT neutral matrix so that B $\circledast$ $I_{flt}$=B. Such a matrix encryption is even harder to attack successfully. Both FLT-based encryptions are non-trivial, are not routine, are not conventional and not known in the art let alone generally well understood.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A cryptographic system, comprising:
a processor configured to exchange over a physical communication channel to a device a message that is generated as part of a cryptographic machine operation that includes an n-state Finite Lab Transform (FLT) based modification of an n-state computer operation having at least 2 inputs, the n-state FLT modification includes each of the at least 2 inputs of the n-state computer operation having an identical n-state reversible inverter not being identity and at an output of the n-state computer operation a reversing n-state reversible inverter, the n-state reversible inverter and the reversing n-state reversible inverter in combination form identity, with n an integer greater than 2.

2. The cryptographic system of claim 1, wherein:
the n-state computer operation is selected from the group of n-state computer operations characterized by operations in the group consisting of a modulo-n multiplication, a modulo-n addition, a multiplication over GF (n) and an addition over GF (n), wherein GF (n) is a finite field with n elements.

3. The cryptographic system of claim 2, wherein the cryptographic machine operation is a digital signature operation.

4. The cryptographic system of claim 3, wherein the cryptographic machine operation is a Schnorr signature based system.

5. The cryptographic system of claim 3, wherein the cryptographic machine operation is a digital signature based system that includes a Fiat-Shamir heuristic.

6. The cryptographic system of claim 3, wherein the cryptographic machine operation is a digital signature system that performs a Feige-Fiat-Shamir identification operation.

7. The cryptographic system of claim 1, wherein the Finite Lab Transform (FLT) modification of the n-state computer operation is stored as a table on a memory.

8. The cryptographic system of claim 1, wherein a data element is processed by the n-state FLT modification as a Gaussian integer.

9. The cryptographic system of claim 1, wherein the message is a ciphertext in the cryptographic machine operation.

10. The cryptographic system of claim 1, wherein the cryptographic machine operation is a public key system operation.

11. The cryptographic system of claim 10, wherein the cryptographic machine operation is an isogeny based operation.

12. The cryptographic system of claim 11, wherein the isogeny based operation includes an input data element that is a point on an elliptic curve on which the isogeny operation is based and of an order not being a power of 2 or 3.

13. The cryptographic system of claim 11, wherein the isogeny based operation includes an input data element that is processed as a point on an elliptic curve on which the isogeny operation is based but is not a point on the elliptic curve of isogeny computation.

14. The cryptographic system of claim 11, wherein one or more computed kernel points are stored after a prior computation and are used in processing the input data.

15. The cryptographic system of claim 10, wherein the cryptographic machine operation is a Goppa-code based operation.

16. The cryptographic system of claim 15, further comprising:
the processor is configured to generate data as a first matrix with p-state elements, p being an integer greater than 2, based on the Goppa code, the first matrix being modified into a first modified matrix by at least a machine multiplication with a scrambling matrix;
data based on the first modified matrix is transmitted over the physical communication channel; and
the processor is configured to modify one or more rows in the first modified matrix and to transmit data based only on the modified one or more rows to the second processor.

17. The cryptographic system of claim 10, wherein the cryptographic machine operation is a N-th degree Truncated polynomial Ring Units (NTRU) based operation.

18. The cryptographic system of claim 10, wherein the cryptographic machine operation is a Feedback Shift Register modeled system.

19. The cryptographic system of claim 18, wherein the cryptographic machine operation is an n-state Feedback Shift Register in a Galois configuration.

20. The cryptographic system of claim 10, wherein publicly exchanged data is processed as an invertible matrix.

* * * * *